(12) United States Patent
Clift

(10) Patent No.: US 11,076,194 B2
(45) Date of Patent: Jul. 27, 2021

(54) TIME-SHIFTED PLAYBACK

(71) Applicant: SONY CORPORATION, Tokyo (JP)

(72) Inventor: Graham Clift, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/199,110

(22) Filed: Nov. 23, 2018

(65) Prior Publication Data

US 2020/0169776 A1    May 28, 2020

(51) Int. Cl.
| | |
|---|---|
| *H04N 5/76* | (2006.01) |
| *H04N 5/92* | (2006.01) |
| *H04N 21/4147* | (2011.01) |
| *H04N 21/438* | (2011.01) |
| *H04N 21/4722* | (2011.01) |
| *H04N 21/6587* | (2011.01) |
| *H04N 21/8547* | (2011.01) |
| *H04N 5/917* | (2006.01) |
| *G11B 27/00* | (2006.01) |
| *H04N 5/93* | (2006.01) |

(52) U.S. Cl.
CPC ..... *H04N 21/4147* (2013.01); *H04N 21/4382* (2013.01); *H04N 21/4722* (2013.01); *H04N 21/6587* (2013.01); *H04N 21/8547* (2013.01)

(58) Field of Classification Search
USPC .......................... 386/291, 295, 326, 330, 278
See application file for complete search history.

(56) References Cited

U.S. PATENT DOCUMENTS

| | | | |
|---|---|---|---|
| 2007/0143493 A1* | 6/2007 | Mullig ........... | H04N 21/234354 709/232 |
| 2014/0282699 A1* | 9/2014 | Fertig .............. | H04N 21/43632 725/32 |
| 2014/0282790 A1* | 9/2014 | Stephens .......... | H04N 21/44004 725/116 |
| 2018/0048932 A1* | 2/2018 | Eyer ................ | H04N 21/64322 |

* cited by examiner

*Primary Examiner* — Daquan Zhao
(74) *Attorney, Agent, or Firm* — Oblon, McClelland, Maier & Neustadt, L.L.P.

(57) ABSTRACT

A reception apparatus includes receiver circuitry configured to receive a broadcast stream that includes (i) a first broadcaster service selected by a user and (ii) a second broadcaster service. The reception apparatus further includes a demodulator configured to demodulate the broadcast stream into a plurality of data packets. The reception apparatus further includes processing circuitry configured to: store the plurality of data packets corresponding to the first and second broadcaster services in a pause buffer, process each data packet associated with the selected first broadcaster service to extract audio and video content, and output, as part of a live TV broadcast, the extracted audio and video content associated with the first broadcaster service to the user during a first time period.

13 Claims, 12 Drawing Sheets

TIME-SHIFTED PLAYBACK

TECHNICAL FIELD

The present disclosure relates to an apparatus, computer readable medium, and method that allows time-shifted playback with interactive content available during a live broadcast.

BACKGROUND

A Personal Video Recorder (PVR) generally enables a user to enjoy the playback of content that was previously recorded. To enjoy the features of a Personal Video Recorder (PVR), the user may choose to capture a live broadcast program in memory for later viewing. Data in the Electronic Program Guide (EPG) identifies the service, time of day and duration of the program of interest. When the program is scheduled to air, the receiver may tune to the indicated service and begin saving media segments in persistent storage. When the user comes back later, or even while the program is being recorded, those media segments may be delivered to a media engine for decoding and presentation. Furthermore, trick play modes such as pause, fast-forward, and fast-rewind may be offered during playback.

In normal live TV operation, media segments (e.g., MPEG DASH Media Segments or MPEG MMT Media Processing Units [MPUs]), are collected and buffered only long enough to be delivered to the media engine for decoding and presentation. If the receiver includes PVR functionality, these media segments may be buffered for later viewing. For example, the DTV may offer a "pause live TV" function.

Furthermore, critical to the viewing of television is the playback of content in accordance with accurate time synchronization of audio and video. Advanced Television Systems Committee (ATSC) 3.0 receivers may be written as specialized applications running on a software operating system (OS) platform. An example OS platform is "Android TV" in which an ATSC 3.0 Application, which is an example of a television receiver application, is written as an Android Application in a digital television (DTV) product supporting that OS, thus enabling the app designer to take advantage of features and functions of the Android OS by means of standard system calls.

To acquire and present a live TV broadcast, the television receiver application may receive and process the signaling associated with a chosen service, inspect the service's MPEG DASH Media Presentation Description (MPD) file, and process an Availability Start Time (AST) parameter in the MPD to determine which media segment files (e.g., separate files for segments of time, and separate sets of files for audio, video, and captions) are the ones most recently transmitted. Choosing among these files, the television receiver application can then join the live broadcast with the lowest amount of latency (implementing a "fast channel change").

AST is specified by the MPEG DASH standard (ISO/IEC 23009-1) as being a UTC time that signals the "the anchor for the computation of the earliest availability time (in UTC) for any Segment in the Media Presentation." The MPEG DASH standard is described in ISO/IEC 23009-1:2014, "Information technology—Dynamic adaptive streaming over HTTP (DASH) Part 1: Media presentation description and segment formats," International Organization for Standardization, 15 May 2014 (hereinafter "MPEG DASH standard"), the entire contents of which are incorporated by reference. The AST is the only time in the MPD that is specified in absolute format, where all other times in the MPD are relative to the AST anchor point.

SUMMARY

According to an embodiment of the present disclosure, there is provided a reception apparatus that includes receiver circuitry configured to receive a broadcast stream that includes (i) a first broadcaster service selected by a user and (ii) a second broadcaster service. The reception apparatus further includes a demodulator configured to demodulate the broadcast stream into a plurality of data packets. The reception apparatus further includes processing circuitry configured to store the plurality of data packets corresponding to the first and second broadcaster services in a pause buffer, process each data packet associated with the selected first broadcaster service to extract audio and video content, and output, as part of a live TV broadcast, the extracted audio and video content associated with the first broadcaster service to the user during a first time period.

According to an embodiment of the present disclosure, there is provided a reception apparatus that includes receiver circuitry configured to receive a broadcast stream that includes a broadcaster service selected by a user, The reception apparatus further includes a demodulator configured to demodulate the broadcast stream into a plurality of data packets. The reception apparatus further includes processing circuitry configured to store the plurality of data packets in a pause buffer, process each data packet associated with the selected broadcaster service to extract audio and video content, output, as part of a live TV broadcast, the extracted audio and video content to the user during a first time period, receive, during a second time period later than the first time period, user input indicating a request to produce audio and video content available during an intermediate time period that is between the first time period and the second time period, retrieve, from the pause buffer, data packets associated with the audio and video content available during the intermediate time period, process each data packet retrieved from the pause buffer to extract the audio and video content available during the intermediate time period, output, as part of a time-shift playback, the audio and video content available during the intermediate time period, and provide at least one content service feature during the time-shift playback of the audio and video content available during the intermediate time period, where the at least one content service feature is included in the plurality of data packets that are stored and retrieved from the pause buffer.

According to an embodiment of the present disclosure, there is provided a reception apparatus that includes receiver circuitry configured to receive a broadcast stream that includes a broadcaster service selected by a user. The reception apparatus further includes a demodulator configured to demodulate the broadcast stream into a plurality of data packets. The reception apparatus further includes processing circuitry configured to determine an operating system clock time, process the data packets to determine a signaled availability starting time (AST) of television content associated with the broadcaster service, determine an expected time of reception of media segments corresponding to the television content based on the signaled AST, determine an actual time of reception of media segments corresponding to the television content, determine an observed AST that represents a summation of the signaled AST with a difference between the time of reception of the media segments and the expected time of reception of the media segments, determine a playback clock time that is offset from the operating system clock time in accordance with the observed AST, and output audio and video content associated with the received broadcaster service in accordance with the determined playback clock time.

According to an embodiment of the present disclosure, there is provided a non-transitory computer readable medium including instructions stored therein, which when executed by a processor in a reception apparatus causes the processor to execute a method that includes storing, in a pause buffer, a plurality of data packets corresponding to a first broadcaster service selected by a user and a second broadcaster service, the first and second broadcaster services received in a broadcast stream that is demodulated into the plurality of data packets, processing each data packet associated with the selected first broadcaster service to extract audio and video content, and outputting, as part of a live TV broadcast, the extracted audio and video content associated with the first broadcaster service to the user during a first time period.

According to an embodiment of the present disclosure, there is provided a non-transitory computer readable medium including instructions stored therein, which when executed by a processor in a reception apparatus causes the processor to execute a method that includes storing, in a pause buffer, a plurality of data packets corresponding to a broadcaster service received in a broadcast stream that is demodulated into the plurality of data packets, processing each data packet associated with the selected broadcaster service to extract audio and video content, outputting, as part of a live TV broadcast, the extracted audio and video content to the user during a first time period, receiving, during a second time period later than the first time period, user input indicating a request to produce audio and video content available during an intermediate time period that is between the first time period and the second time period, retrieving, from the pause buffer, data packets associated with the audio and video content available during the intermediate time period, processing each data packet retrieved from the pause buffer to extract the audio and video content available during the intermediate time period, outputting, as part of a time-shift playback, the audio and video content available during the intermediate time period, and providing at least one content service feature during the time-shift playback of the audio and video content available during the intermediate time period, where the at least one content service feature is included in the plurality of data packets that are stored and retrieved from the pause buffer.

According to an embodiment of the present disclosure, there is provided a non-transitory computer readable medium including instructions stored therein, which when executed by a processor in a reception apparatus causes the processor to execute a method that includes processing data packets demodulated from a received broadcast stream to determine a signaled availability starting time (AST) of television content associated with a broadcaster service included in the received broadcast stream, determining an expected time of reception of media segments corresponding to the television content based on the signaled AST, determining an actual time of reception of media segments corresponding to the television content, determining an observed AST that represents a summation of the signaled AST with a difference between the time of reception of the media segments and the expected time of reception of the media segments, determining a playback clock time that is offset from the operating system clock time in accordance with the observed AST, and outputting audio and video content associated with the received broadcaster service in accordance with the determined playback clock time.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
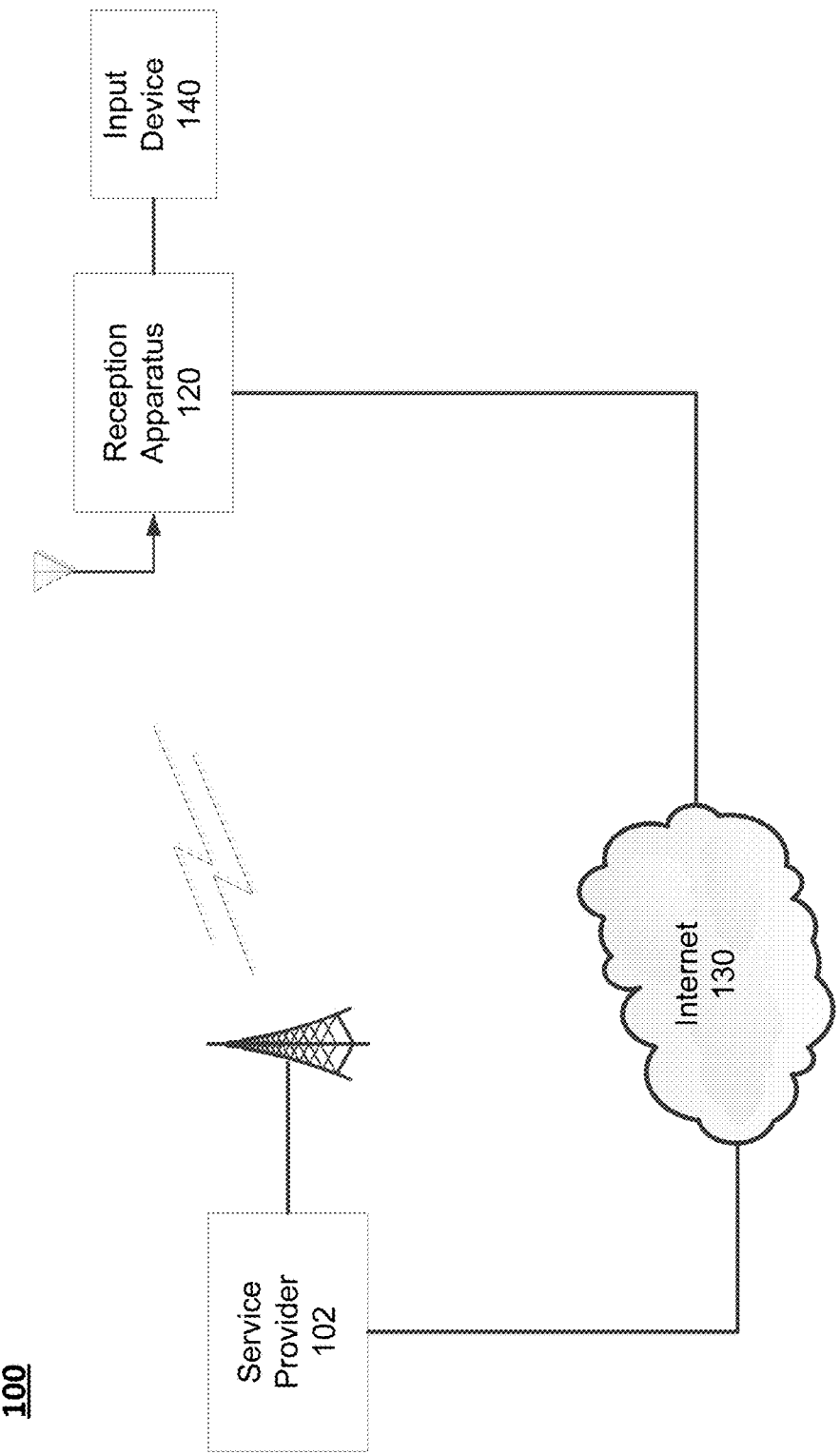
FIG. 1 illustrates an exemplary digital television broadcast system.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an EPG.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to providing access to protected content.

Embodiments of the present disclosure disclose an implementation of PVR in a television reception apparatus (e.g., ATSC 3.0 receiver) that offers several novel features compared to conventional PVR capability, including the support, during time-shifted playback, of any interactive features that might have been offered by the broadcaster during the live broadcast. The user may choose to enjoy different presentation options, such as different language audio track or captions, during playback of the program. Embodiments of the present disclosure further include the storage of audio/video/caption/application data from the broadcast in the form of Internet Protocol (IP) packets or ATSC 3.0 Link layer Protocol (ALP) packets, which are described in ATSC Standard A/300-ATSC 3.0 System, dated Oct. 19, 2017, the entirety of which is incorporated herein by reference (hereinafter "A/300 Standard").

Embodiments of the present disclosure are directed to adding features to receivers with PVR capability such as:

(1) The ability to interact with programming during a time-shifted playback in the same manner as if the programming were broadcast live.
(2) The availability in the recording of multiple audio language or video tracks so that the user may choose a desired presentation of the recorded program in the same manner as if the programming were broadcast live.
(3) Buffering multiple services in a "pause buffer" when an ATSC 3.0 broadcast includes multiple sub-channels whereas conventional receivers buffer only the service the user is currently viewing.

In ATSC 3.0 broadcast protocol, for example, program components such as audio, video, captions, and applications may be delivered in separate file-based content streams. A PVR design in which all available program components are stored offers the viewer the ability to choose their desired presentation on playback, the same as they could have if the program had been viewed live in real time (not time-shifted). Further, the same program can be played back with one or more components chosen differently than before (e.g., different languages or viewing angles may be played during repeated play back of the same content).

In some embodiments, the television receiver apparatus operates in a "runtime application environment," which allows the broadcaster to supply a broadcaster application (e.g., HTML5 application) that may be launched alongside the programming being viewed. The broadcaster application can operate silently in the background to perform tasks such as service usage monitoring or personalized advertising, or the broadcaster application can present text and graphics to the user so that the user can interact with the contents of the program. The designer of the broadcaster application has access to a rich set of TV-related functions, including the ability for designing the broadcaster application to cause different services, different audio, video, or caption tracks to be selected, and the ability to cause the video presentation to be scaled and positioned on-screen.

As described in the application titled Receiver Device Including Native Broadcaster Application, App. No. 16/199, 027, issued as U.S. Patent No. 10,764,640, filed on Nov. 23, 2018, the entire contents of which are incorporated herein by reference, when the receiver is built on, for example, an Android platform, a broadcaster may supply a native broadcaster application (e.g., Android application), which operates in conjunction with, or takes the place of a broadcaster application delivered within the broadcast signal. Either or both of the broadcaster application or native broadcaster application can offer interactive experiences to the user.

Embodiments of the present disclosure also include a method for derivation of a "Wall Clock Time" in the receiver that is based on analysis of the MPD file supplied by the broadcaster. To process and make use of AST for fast acquisition of a service, the receiver can compare the signaled AST value with the time of day specified by an operating system of the receiver, and compute which media segment(s) are the ones that have been most recently been made available. These are the files that have just arrived in the receiver, which means that if the receiver begins by decoding and presenting these just-arrived files, the receiver will have joined the service at the so-called "live edge." The DASH Interoperability Forum (DASH-IF) has published a guidelines document for DASH implementations in "Guidelines for Implementation: DASH-IF Interoperability Points," Dash Industry Forum, V. 4.1, Sep. 7, 2017, the entire contents of which are incorporated herein by reference. The DASH-IF guidelines discloses the "live edge" features for dynamic MPDs and live streaming as understood by one of ordinary skill in the art.

The ATSC standards may require the broadcaster to operate the broadcast station using extremely accurate time of day clocks synchronized to Global Position System (GPS) sources. Acquisition of a service by the receiver at the live edge requires that the receiver know the correct time of day with good accuracy (e.g., 100 msec. would be acceptable). However, the time of day clocks in a typical consumer receiver may not be accurate. Some operating systems resynchronize the system clock, which provides time of day services to applications, only once per week. Accordingly, during a week's time between resynchronization of the system clock, the clock may drift fast or slow.

If an incorrect value is used for the system time, the computation of the correct media segment to use for service acquisition may reference a media segment that has not been transmitted yet, or may point to an older one than the one most recently received. In the former case, acquisition is delayed while the receiver waits for the requested file to arrive, thus slowing acquisition. In the latter case, the referenced file may never be available because it was broadcast before the receiver began the process of acquiring the service. Accordingly, the embodiments of the present invention address these inaccuracies by derivation of a "Wall Clock Time" in the receiver that is based on analysis of the MPD file supplied by the broadcaster.

FIG. 1 is an exemplary digital television broadcast system 100 for providing access to television content. The system includes a service provider 102, a reception apparatus 120, and an input device 140. The reception apparatus 102 may be configured to receive data via an antenna. The reception apparatus 102 may further be configured to connect to the Internet 130 to receive data.

In one example, the service provider 102 is a broadcaster of television content and the reception apparatus 120 may be any device that is configured to operate as a television such as a flat screen TV, laptop, tablet, or smart phone. The input device 140 may be physically or wirelessly connected to the reception apparatus 120 and may be any device suitable to operate the reception apparatus 120 such as a remote with numeric keys and/or alphanumeric keys or a QWERTY keyboard. The keys on the input device 140 may be either physical buttons or the digital representation of numeric or alphanumeric keys on a touchscreen. Embodiments of the present disclosure may be utilized to provide access to other broadcast content (e.g., executable applications such as HTML5 applications). The service provider 102 transmits a broadcast stream that includes television content and may be delivered via a digital television broadcast signal.

The service provider 102 (e.g., a broadcaster entity or broadcast station), in one embodiment, is a service distribution system that includes a transmission apparatus with a transmitter that is configured to transmit content, applications, and/or services in a data stream (e.g., a broadcast stream) to the reception apparatus 120. The transmitter is configured to provide the data stream to the reception apparatus 120, for example via a digital terrestrial broadcast. In other examples, the data stream may be transmitted to the reception apparatus 120 over one or a combination of the digital terrestrial broadcast, a mobile phone network, a broadband network such as the Internet, a cable network, and a satellite link. The service distribution system may use any one or a variety of transmission techniques to communicate the data stream to the reception apparatus 120.

The service distribution system according to one embodiment includes a source encoder, a channel encoder, and a modulator. The source encoder includes data, audio, and video encoders to compress the audio, video, signaling, control or other data received from a source. The channel encoder randomizes, interlaces, channel codes, and frame maps the compressed media and signaling data. For example, the channel encoder includes a frame builder that forms many data cells into sequences to be conveyed on orthogonal frequency-division multiplexing (OFDM) symbols. The modulator (e.g., a multiplexer) converts the processed digital data into modulation symbols, which can be, for example OFDM symbols. The multiplexed data is then passed to an inverse fast Fourier transformer (IFFT) which transforms a frequency domain signal into a time domain signal. The time domain signal is fed to a guard insertion module for generating a guard interval (GI) between symbols and then to a digital-to-analog (D/A) converter. Then, up-conversion, RF amplification, and over-the air broadcasting are performed to transmit a broadcast stream.

Certain components of the transmission apparatus or the reception apparatus may not be necessary in other embodiments. Details of an OFDM transmitter and receiver may be found, for example, in the DVB-T2 standard (ETSI EN 302 755 V1.4.1 dated Jul. 1, 2015), ATSC Standard A/322— Physical Layer Protocol, dated Jun. 6, 2017 (hereinafter "A/322 Standard"), and ATSC Standard A/321—System Discovery and Signaling, dated Mar. 23, 2016 (hereinafter "A/321 Standard"), each of which are incorporated herein by reference in their entirety.

Figure 2:
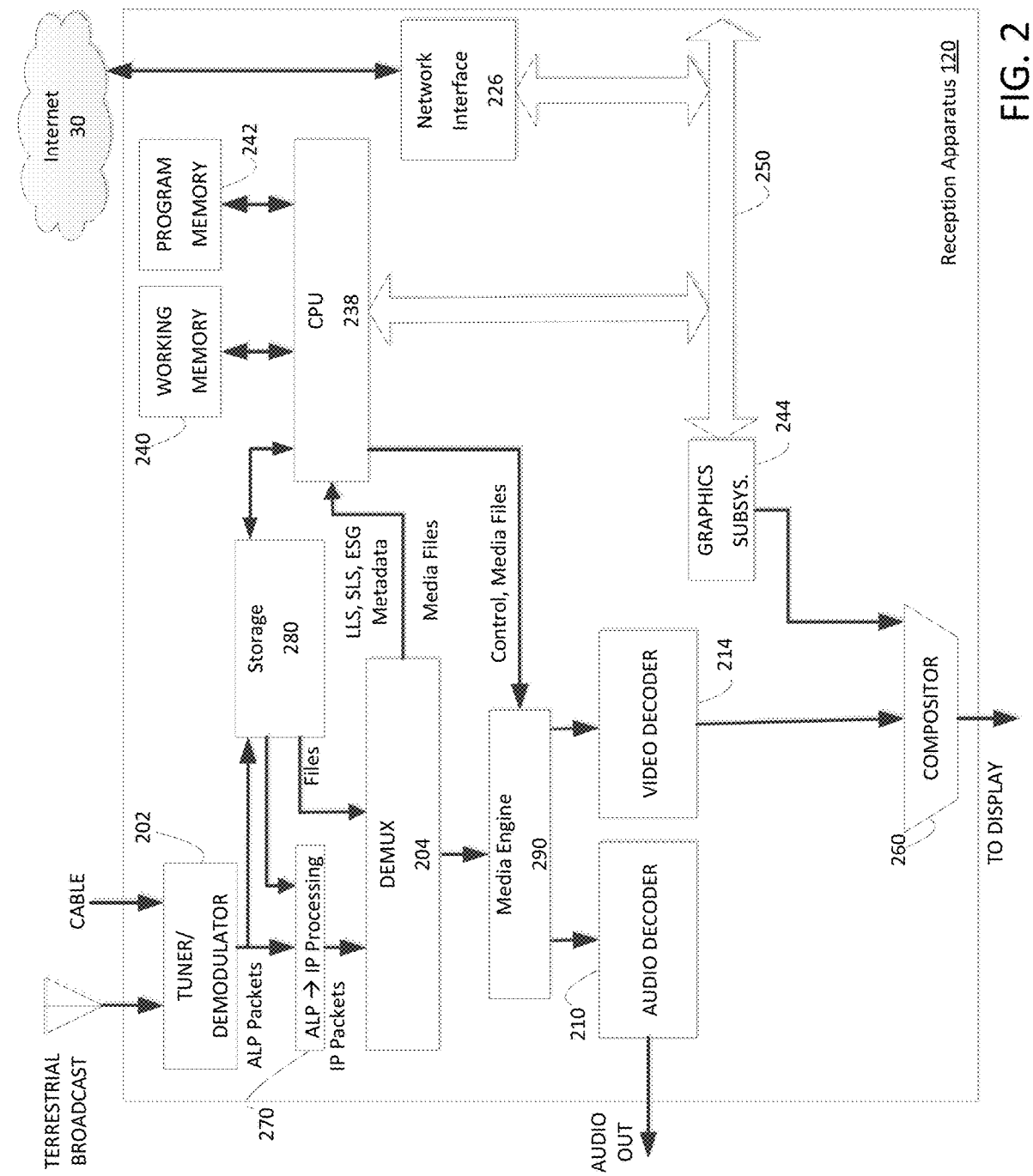
FIG. 2 illustrates an exemplary reception apparatus.

FIG. 2 illustrates an exemplary reception apparatus 120, which is configured to access television content and broadcaster applications. The reception apparatus 120 may be a fixed or mobile device such as a television set, a set top box, smartphone, tablet computer, laptop, portable computer, or any other device configured to receive television content. Further, the reception apparatus 120 may be a digital television receiver that is incorporated in a vehicle or any of the fixed or mobile devices described above.

The reception apparatus 120 includes receiver circuitry that is configured to receive a data stream (e.g., a broadcast stream) from one or more service providers 102 and processing circuitry that is configured to perform various functions of the reception apparatus 120. In one embodiment, a tuner/demodulator 202 receives broadcast emissions containing the broadcast stream. Depending on the embodiment, the reception apparatus 120 may alternatively or additionally be configured to receive a cable television transmission or a satellite broadcast.

When an ATSC 3.0 broadcast emission has been acquired by the tuner/demodulator 202, data packets such as ALP packets to a processor 270 that converts these packets to Internet Protocol (IP) packets for further processing. ALP packets may also be buffered and saved to persistent storage 280 for the purposes of time-shifting the broadcast. Persistent storage 280 can be implemented using disc storage form as well as other forms of storage such as non-transitory storage devices including, for example, network memory devices, magnetic storage elements, magneto-optical storage elements, flash memory, core memory and/or other non-volatile storage technologies.

A demultiplexer 204 may demultiplex the data stream, which has been converted to IP packets, using any necessary files from storage 280, and deliver the demultipexed data to media engine 280 for decoding into separate audio and video (A/V) streams. Files that are outputted by the demultiplexer 204 such as metadata, Low Level Signaling (LLS) and the Service Layer Signaling (SLS) files, media files, and Electronic Service Guide (ESG) files may be provided to the CPU 238 for processing. The ATSC Standard A/331—Signaling, Delivery, Synchronization, and Error Protection, dated Dec. 6, 2017, incorporated by reference in its entirety (hereinafter "A/331 Standard"), specifies LLS and SLS for ATSC 3.0. The audio is decoded by an audio decoder 210 and the video is decoded by a video decoder 214.

The reception apparatus 120 generally operates under control of at least one processor, such as the CPU 238, which is coupled to the persistent storage 280, a working memory 240, program memory 242, and a graphics subsystem 244 via one or more buses (e.g., bus 250). The CPU 238 is configured to generate a user interface for a user to acquire license information to access the protected service according to one embodiment. The graphics outputted by the graphics subsystem 244 are combined with video images by the compositor and video interface 260 to produce an output suitable for display on a video display.

The CPU 238 operates to carry out functions of the reception apparatus 120 including executing script objects (control objects) contained in a broadcaster application (e.g., HTML5 application), using for example an HTML5 user agent stored in the program memory 242. Native broadcaster applications may reside in program memory 242 as well.

In one embodiment, the collection of files making up the broadcaster application can be delivered over broadcast as packages, via the ROUTE protocol described in A/331Standard, for example. An exemplary broadcaster application framework is described in ATSC Standard A/344-ATSC 3.0 Interactive Content, dated Dec. 18, 2017, which is incorporated by reference in its entirety.

The CPU 238 may be coupled to any one or a combination of the reception apparatus 120 resources to centralize control of one or more functions, in certain embodiments. In one embodiment, the CPU 238 also operates to oversee control of the reception apparatus 120 including the tuner/demodulator 202 and other television resources.

Figure 3:
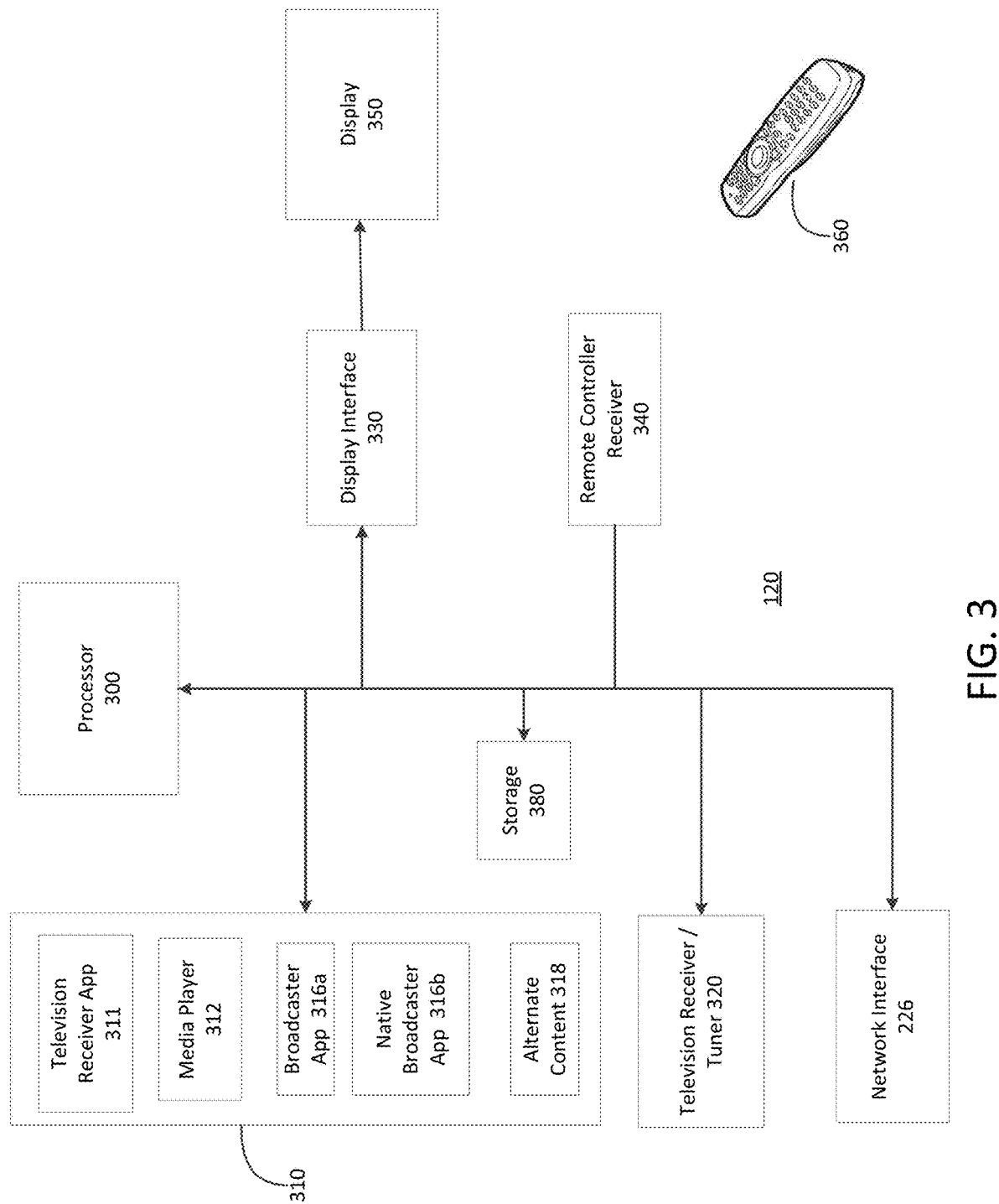
FIG. 3 is a processor-centric block diagram of an exemplary reception apparatus.

A more processor-centric view of the reception apparatus 120 is illustrated in FIG. 3. Memory 240 and 242 are depicted collectively as memory 310. Further, a processor 300 includes one or more processing units such as CPU 238. Similarly, the various demodulators, decoders, etc., that initially process digital television signals are collectively depicted as television receiver/tuner 320. The reception apparatus 120 further includes a remote controller 360 which communicates with a remote controller receiver interface 340. Additionally, the display 350 is connected to a display interface 330, which includes for example the compositor 260, and is either a display integral to the reception apparatus 120 as in a television set or a connected display device as in the case where the reception apparatus 120 is integrated into a set-top box.

Memory 310 contains various functional program modules and data. The memory 310 stores the data used by the reception apparatus 120. The memory 310 within the reception apparatus 120 can be implemented using disc storage form as well as other forms of storage such as non-transitory storage devices including, for example, network memory devices, magnetic storage elements, magneto-optical storage elements, flash memory, core memory and/or other non-volatile storage technologies. The term "non-transitory" is a limitation of the medium itself (i.e., tangible, not a signal) as opposed to a limitation on data storage persistency (e.g., RAM vs. ROM). A storage 380, which may correspond to storage 280 (FIG. 2), is also included for storing of recordings for time-shifted playback.

The memory 310 includes the television receiver application 311. Both the broadcaster application 316*a* and native broadcaster application 316*b* are stored in the memory 310. The broadcaster application 316*a* may be an HTML5 application that is included in a broadcast stream. The native broadcaster application 316*b* may either be provided with the reception apparatus 120 or installed at a later time (e.g., downloaded from an app store). The broadcaster application 316*a* and native broadcaster 316*b* are executed by the processor 300. Further, these applications may cause the processor 300 to control the reception apparatus 120 to acquire alternate content 318, which is stored in the memory 310 for subsequent retrieval. In another embodiment, the processor 300 causes the reception apparatus 120 to retrieve or stream the alternate content 318 at the time of presentation.

The technical aspects of a PVR design in which the above mentioned features are made available to the user includes, for example:

(1) Storing in memory (volatile or non-volatile) content beyond just the main video track and the audio track corresponding to the default or user-preferred language;

(2) Appropriate modification of the Service Layer Signaling data to effect time-shifted playback (details below); and (3) Management of a broadcaster application and/or native broadcaster application to effect synchronization of the audio, video, captions, and interactive content portions of the program during the playback.

In related PVR designs involving time-shifting digital television content based on the ATSC 1.0 (existing DTV system) standards, or those designs in which analog TV signals were digitized, compressed, and stored on disk, typically only the main video and one audio track were stored for later playback. In the related DTV system, MPEG-2 Transport Stream (TS) was used as the transport. In this situation, PVRs would create "partial" transport streams consisting only of the MPEG-2 TS packets from the video elementary stream (ES) and the audio elementary stream. Captions were encoded inside the Video ES. The partial TS could be played back in a time-shifted manner. Synchronization and timing were straightforward, as the ES components contained Program Clock References (PCRs) in the video and Presentation Time Stamps (PTSs) in both the video and audio. The ATSC 1.0 system did not standardize broadcaster applications.

Advancements in digital video compression technology (HEVC vs. MPEG-2) as well as improvements in the efficiency of the physical layer (e.g., modulation and coding) have resulted in higher capacity of broadcast signals. In some embodiments, a broadcast stream such as an ATSC 3.0 broadcast signal includes two or more ATSC 3.0 services. Therefore, a broadcast stream may be configured to carry broadcasts of multiple broadcasters, where each broadcaster provides one main channel along with one or two sub-channels within the allotted bandwidth (e.g., 6 MHz for terrestrial broadcast systems in the U.S.) for the broadcast stream.

Figure 4:
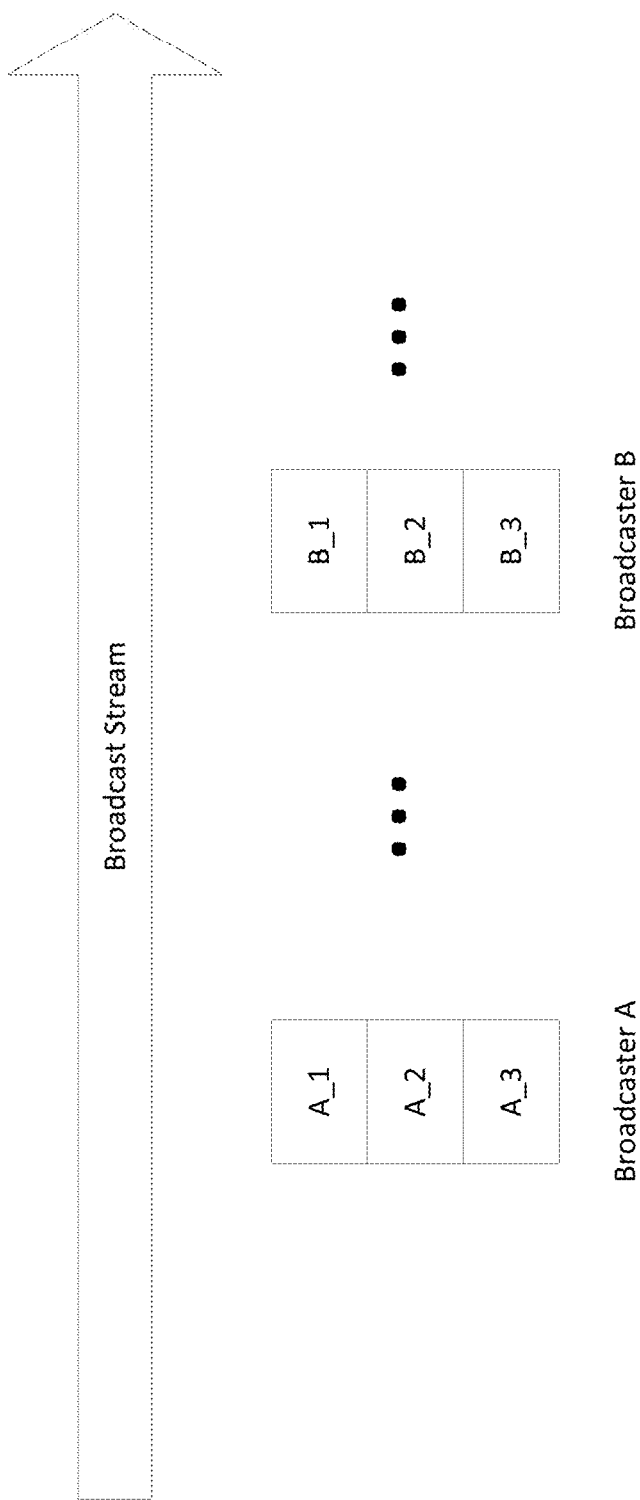
FIG. 4 illustrates an exemplary broadcast stream.

FIG. 4 illustrates an embodiment of a broadcast stream that is received by reception apparatus 120. As an example, when a user is operating a television, the user may select a particular channel associated with the broadcaster. Upon selection of the channel, the broadcast stream containing at least the channel selected by the user is presented. Furthermore, the broadcast stream may include multiple channels by the same broadcaster, and may also include multiple channels by another broadcaster (e.g., broadcaster B).

Figure 5:
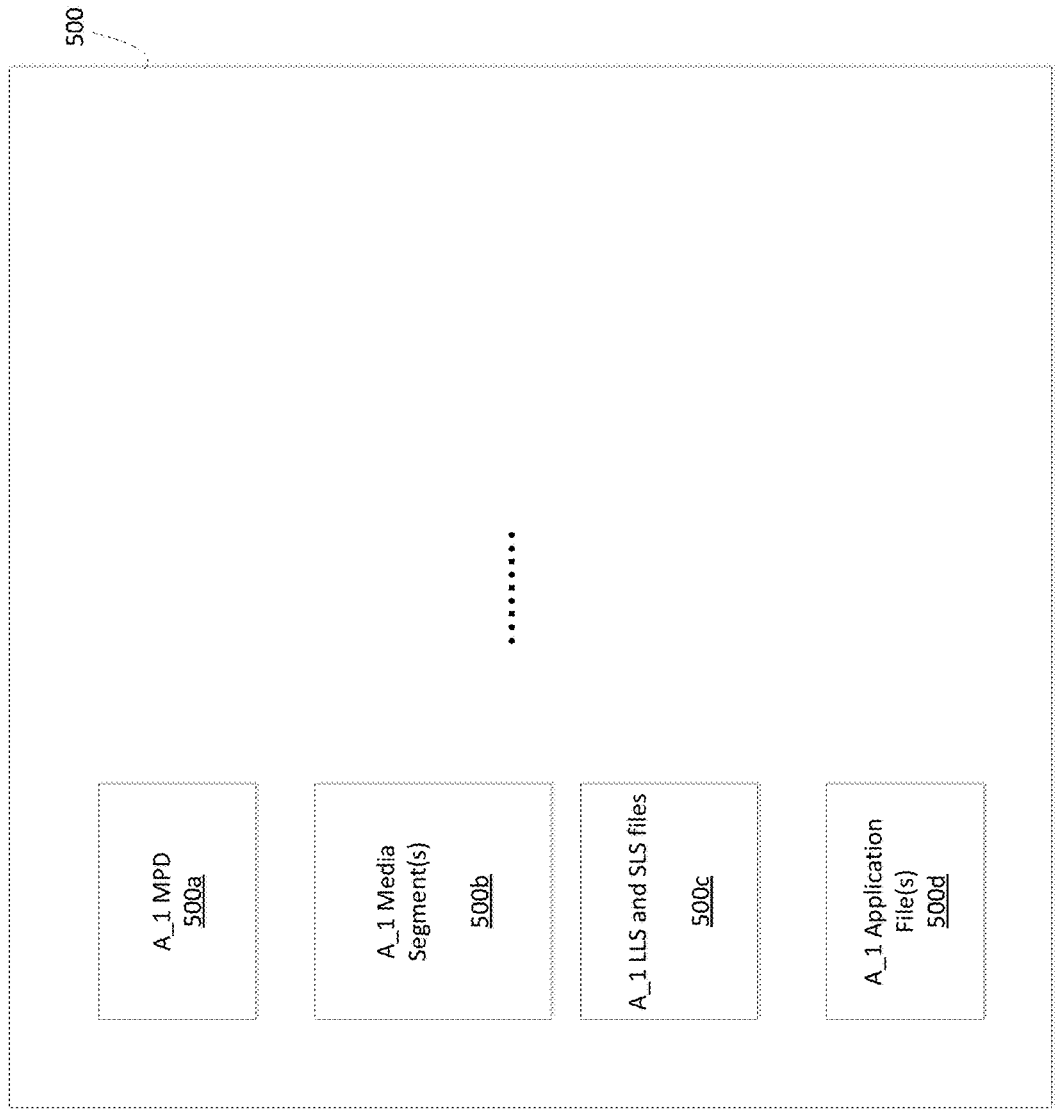
FIG. 5 illustrates an exemplary database structure in the pause buffer.

FIG. 5 illustrates an embodiment database structure 500 that represents files stored in any type of memory that serves as a pause buffer. As illustrated in FIG. 5, for each broadcaster service (e.g., A_1) the database structure may store a media presentation description file 500*a*. The media presentation description file can indicate the AST as well as the location of media segments 500*b* corresponding to the selected service. The database structure 500 includes LLS and SLS files 500*c* for each broadcaster service. Additionally, the database structure for the broadcaster service may include any associated application files 500*d* such as a broadcaster application.

The buffering of packets from the broadcast stream can determine which services are available for playback. In some embodiments, a reception apparatus can buffer all the IP packets within any broadcast stream (e.g., ATSC 3.0 broadcast signal) in the "pause buffer." Furthermore, a DTV product not advertised, or initially configured, as having "PVR capability" can implement a pause buffer using the existing memory of the DTV product such as volatile memory or a persistent storage. When the DTV product stores all the data broadcast in the broadcast stream, the following significantly advantageous features are achieved:
(1) If the user chooses to switch to a different service that has been transported in the same broadcast signal, the switching time is nearly instantaneous.
(2) The user can select from among an available set of audio and caption language options even when playing content back from the pause buffer.
(3) Interactive elements can be paused along with audio/video/captions, while maintaining the synchronization between the interactive elements and the program playback.
(4) If the user begins watching Service A for a while, then switches to Service B, which is broadcast on the same signal, the user can "rewind" to see some of the previously broadcast content on that service in accordance with the depth of the pause buffer and the amount of time the receiver has been tuned to this broadcast signal.

A brute-force recording of every broadcast packet is inefficient because certain packets deliver files which are repeated in the broadcast signal for the benefit of receivers who are just joining the broadcast. Examples of repeated files include the Low Level Signaling (LLS) and the Service Layer Signaling (SLS) files, Initialization Segment (IS) files (see MPEG DASH Standard) and the files comprising the broadcaster applications.

In some embodiments, an advantageous optimization over the technique of storing every broadcast packet is achieved by storing only the first instance of any repeated file. For example, instead of recording every IP or ALP packet in the broadcast, the individual files obtained from processing the IP or ALP packet are stored. Accordingly, if a file found in the broadcast is found to be a duplicate of one already saved, the duplicate file can be discarded, or the previously stored copy erased (i.e., the memory the file occupies freed up) once the new copy is saved in memory.

Storing all the file objects delivered in a given ATSC 3.0 transmission signal can impose a significant burden on the processing in the receiver. While the Tuner/Demodulator 202 yields ALP packets after demodulation, the process of turning ALP packets into files includes 1) converting ALP packets into IP packets; 2) processing the Lower Layer Signaling (LLS) and Service Level Signaling (SLS) files for each service multiplexed in the broadcast signal to discover information about each file object in the broadcast stream; and 3) retrieving each file object and saving it into a file system.

By buffering ALP packets directly in the pause buffer, the disclosed embodiments provide the significantly advantageous features of not having to process every ALP packet and file included in a broadcast stream. As illustrated in FIG. 2, the ALP packets can flow downward for direct live playback (e.g., output of decoded audio and video), or can be saved to a pause buffer, which may be implemented in storage 280. ALP packets saved in the pause buffer can be retrieved from the pause buffer and forwarded to the same decoding and media presentation functions. In some embodiments, every ALP packet that comes from the tuner/demod 202 is stored in the pause buffer. In some embodiments, all files derived from the ALP packets are stored in the pause buffer. Furthermore, in some embodiments, all ALP packets that are associated with a given service are stored in the pause buffer. Additionally, in some embodiments, all files associated with a given service are stored in the pause buffer.

In some embodiments, a television receiver application utilizes files in the broadcast stream to determine parameters used for time-shifted playback. The A/331 Standard defines two options for transport protocols, MPEG Dynamic adaptive streaming over HTTP (DASH) (in conjunction with a FLUTE-like broadcast file delivery protocol called ROUTE), and MPEG MMT (ISO/IEC 23008-1:2017 "Information technology—High efficiency coding and media delivery in heterogeneous environments—Part 1: MPEG media transport (MMT)," International Organization for Standardization, August 2017, the entire contents of which are incorporated herein by reference). As discussed above, MPEG DASH is standardized in ISO/IEC 23009-1. According to some embodiments, the reception apparatus supports DASH/ROUTE transport.

In MPEG DASH, a Media Presentation Description (MPD) file is a data structure that references the locations of media segments carrying audio, video, and captions. In some embodiments, the MPD includes a parameter called the Availability Start Time (AST), which may be identified as the MPD@availabilityStartTime attribute in the MPD file. The AST anchors all the timing aspects of a broadcast to a clock time (date and time of day). The receiver, which has information corresponding to a current time of day, uses the AST parameter to determine which media segment can be retrieved to begin initial playback of the content of a service.

In some embodiments of a reception apparatus that is operating as an ATSC 3.0 receiver built on an Android OS platform, a media player library is included to decode and render content. The media player's standard audio and video components may build on Android's MediaCodec API. Furthermore, the media player may support DASH.

When the media player receives a request to play live streaming content, the AST given in a broadcast MPD may be adjusted such that when the receiver first acquires the service, the media player attempts to fetch the optimal media segment for fastest possible acquisition of a selected service. This method yields the lowest possible channel change time. An adjustment to the AST may be necessary if the internal time of day clock used by the Android OS is not in exact alignment with the GPS time used by the broadcaster. This clock adjustment is disclosed below.

If the reception apparatus or PVR includes a pause buffer for pausing live TV, the media player can be made aware of the availability of older media segments, for example, to support Pause and Rewind operations. The DASH MPD includes an attribute called MPD@timeShiftBufferDepth for the purpose of indicating the availability of older media segments. The broadcaster may set this parameter to a low value in recognition of the fact that that the media segments are pushed via broadcast rather than being available to be pulled from an HTTP server. The reception apparatus can adjust the value of MPD@timeShiftBufferDepth to reflect the availability of media segments in the time-shift buffer so that the media player can operate more effectively and provide the user with the most flexible playback experience. For example, if the time-shift buffer contains the past five minutes of audio/video/caption segments, the receiver can set the MPD@timeShiftBufferDepth to a value of five minutes (e.g., the attribute value may be set to "PT5M").

In some embodiments, the media player can be used to play back time-shifted content, for example, content that has been recorded and stored for viewing at a later time by executing a PVR function. The MPD, as transmitted by the broadcaster, may be of the "dynamic" variety (see MPD@type, MPEG DASH Standard, Section 5.3.9.5.3

Media Segment information). In some embodiments, once DASH content has been stored, a "static" MPD can be created to reference the stored media segment files. Static MPDs are suitable for video-on-demand content, which the content becomes after being stored. Information describing the program content, such as the title, rating, synopsis, original air date/time, etc.) can be stored in a separate manifest file.

Generally, a DASH client in a user's device accesses a DASH server to access the MPD and then the referenced Media Segment files. The access is over the Internet using HTTP protocols. However, when DASH is implemented in an ATSC 3.0 receiver, since the content is stored locally and consumed locally, the full HTTP stack is not required to be used. For example, the HTTP GET operations can be replaced with fetches of files through the file system supported in the OS that hosts the ATSC 3.0 receiver application.

According to some embodiments, in an ATSC 3.0 receiver implementation employing the media player for media rendering, the media player's native support of MPEG DASH is used. As with any device operating as a DASH client, the DASH MPD drives the choice of which Media Segment files (e.g. what portion of a program) it will render. When a DASH client is requested to render a live TV broadcast, based on the time of day and processing the AST (e.g., MPD@availabilityStartTime) included in the broadcast MPD, along with other parameters in the MPD, the DASH client can compute which media segment is the newest (i.e., most recently transmitted) and use that for the start of playback. This process may occur when the receiver first encounters a broadcast service after a channel change.

According to some embodiments, if a receiver is configured to use a DASH client to render content that has been time-shifted, the receiver can adjust the AST to indicate a time of day that is earlier than the actual time by a predetermined amount. Based on this adjustment, the DASH client would then request older Media Segment files from the buffer.

As shown in FIG. 2, in some embodiments, ALP packets provided by the Tuner/Demod 202 in the reception apparatus 120 can be directly stored in a pause buffer, which may be implemented in storage 280. In further embodiments, the pause buffer may be implemented in working memory 240 (e.g., RAM).

In some embodiments, for an ATSC 3.0 broadcast emission in which the broadcaster is using the IP protocols defined in the ATSC 3.0 standards (A/330, A/331, A/337, A/344, etc.), ALP packets are a combination of compressed IP packets with a few signaling packets interspersed. The A/337 Standard is defined in ATSC Standard: Application Signaling (Doc. A/337:2018 dated Jan. 2, 2018) (hereinafter "A/337 Standard"), the entire contents of which are incorporated by reference. The compression of IP packets is primarily header compression, employed to optimize the efficiency of delivery of multicast UDP/IP packets within the broadcast.

A certain amount of CPU overhead is used to process the ALP protocol defined in the A/330 Standard, for example, to decompress ALP packets to yield IP packets. In some embodiments, whenever the user requests viewing of one of the (possibly many) services included in the broadcast stream, the ALP packets associated with the requested service is processed in real-time. However, the ALP packets carrying services other than the chosen service do not need to be processed in real-time, and can be directly stored in the pause buffer.

As understood by one of ordinary skill in the art, UDP/IP packets corresponding to a given IP source/destination address and port number may be transmitted in a particular Physical Layer Pipe (PLP) as specified in the A/321 Standard and A/322 Standard. In some embodiments, a given broadcast emission can have up to 64 different PLPs. If the user chooses to view Service A, and all the components and signaling (SLS) for Service A are carried in PLP #1, in some embodiments, all the ALP packets from PLP #1 are processed into IP packets so that real-time viewing of Service A can be achieved. The ALP packets from PLPs other than PLP #1 can be stored in the pause buffer without being processed into IP packets.

If the user then wishes to switch to Service B, and ALP packets for that service are in the pause buffer, the receiver can play back Service B by retrieving the appropriate ALP packets and/or files from the pause buffer, and even allow the user to rewind to see a portion of the programming that had been missed while the user was watching Service A. After retrieving the appropriate ALP packets corresponding to Service B from the pause buffer, the receiver can subsequently process the retrieved ALP packets in the same manner as if Service B were initially chosen for live broadcast viewing.

Since all the ALP (and IP) packets associated with any given service are buffered, when viewing live TV, the user may choose different options for viewing and enjoying the programming, including choosing to turn on closed captions with multiple choices of languages, or alternate audio tracks of different types of languages if available. Since all the ALP packets associated with any given service included in a broadcast stream are stored in the pause buffer, these same choices are available to the user when the user views time-shifted content.

Figure 6:
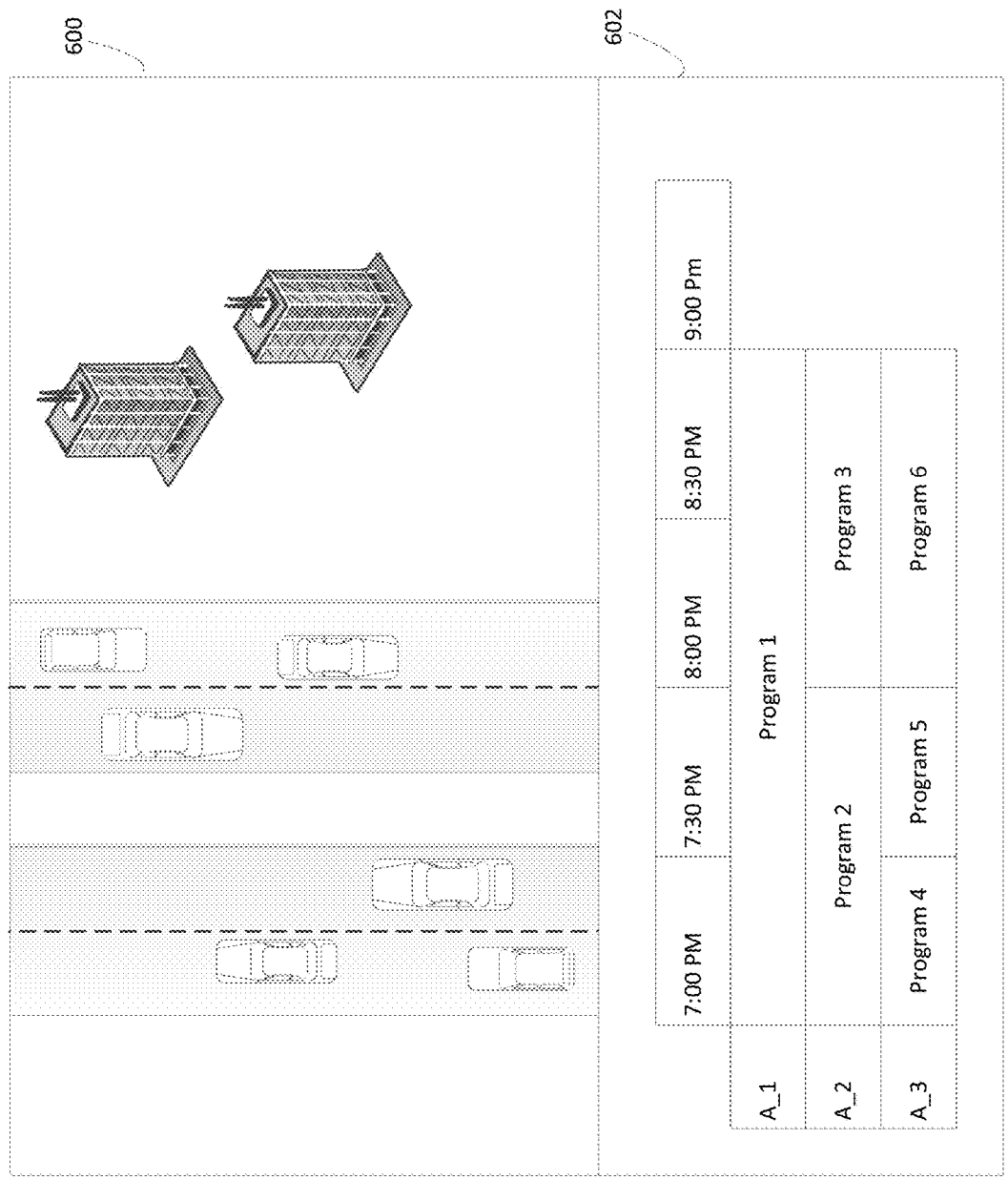
FIG. 6 illustrates an exemplary display with an electronic programming guide.

FIG. 6 illustrates an exemplary display 600 in which an electronic programming guide 602 is also displayed. As illustrated in the electronic programming guide 602, a broadcaster may have three channels A_1, A_2, and A_3. The channel A_1 may have Program 1 that is available from 7:00 p.m. to 9:00 p.m. The channel A_2 may have Program 2 available from 7:00 p.m. to 8:00 p.m. and Program 3 available from 8:00 p.m. to 9:00 p.m. The channel A_3 may have Program 4 available from 7:00 p.m. to 7:30 p.m., Program 5 available from 7:30 p.m. to 8 p.m., and Program 6 available from 8 p.m. to 9 p.m.

Figure 7:
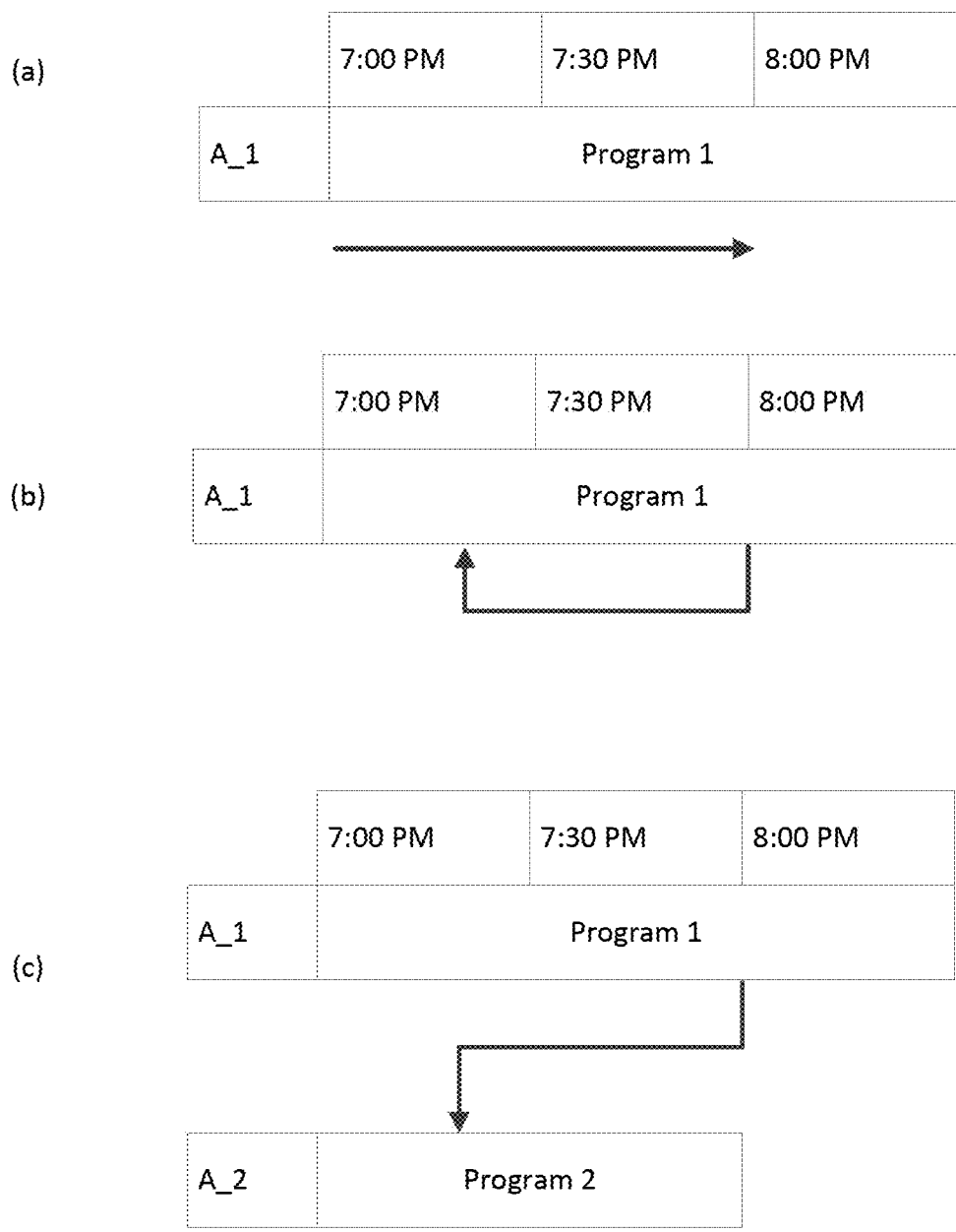
FIG. 7 illustrates exemplary time-shift viewing examples.

FIG. 7 illustrates example viewing scenarios based on the available programs illustrated in FIG. 6. For example in FIG. 7(a), a user may have selected channel A_1 and started watching program 1 at 7 p.m. In FIG. 7(b), at 8 p.m., the user requests playback of Program 1 starting at a time before 8 p.m. (e.g., approx. 7:15 p.m.). Since the content associated with Program 1 is stored in a pause buffer, audio and video content of Program 1 corresponding to the playback time 7:15 p.m. are available, as well as any content service features such as language preference or viewing angle preference that would have been available if the user were watching Program 1 live at 7:15 p.m. FIG. 7(c) illustrates another scenario where at 8:00 p.m., the user may stop playback of Program 1 and select viewing of Program 2, which is provided by channel A_2. Furthermore, the user may request playback of content of Program 2 that was available before 8:00 p.m. (e.g., 7:15 p.m.). Since Program 2 would have been downloaded in the broadcast stream when Program 1 was selected by the user 1, the audio and video content of Program 2 corresponding to the playback time 7:15 p.m. are available, as well as any content service features (e.g., language preference, viewing angle, etc.) that would have been available if the user were watching Program 2 live at 7:15 p.m.

As discussed above, according to some embodiments, the reception apparatus runtime environment is configured to run at least two different applications: (1) broadcaster application (e.g., broadcaster HTML5 application) and (2) native broadcaster application (e.g., Android application when the receiver is built on an Android platform.

In some embodiments, a broadcaster application is transmitted alongside the audio/video/caption content comprising a selected service. The broadcaster application may include files referenced by an SLS table called the HELD (i.e., an acronym for HTML Entry pages Location Description) defined in the A/337 Standard.

A broadcaster application, when executing, can offer an interactive experience that is synchronized with the program content. For example, for an interactive experience with a game show, the broadcaster application can let the user guess the answer to a quiz question that is asked at one point in time during the program. In this example, the broadcaster application may display a "yes or no?" dialog at the appropriate moment and record any answer for a later review of results.

According to some embodiments, the broadcaster application determines the appropriate timing for events (e.g., such as for the dialogs in the game show example) by responding to an Event (see A/344 Standard, Section 6.3.2 Broadcaster Application Events [Static/Dynamic]). Events can be "dynamic" or "static."

In some embodiments, when the event is a dynamic event, the broadcaster embeds an 'emsg' (Event message) box into one of the media segment files of a representation such that the 'emsg' is encountered and processed at the appropriate point in the playback. The representation may be a collection and encapsulation of one or more media streams in a delivery format and associated with descriptive metadata. For example, the representation may be audio streams (e.g., one representation per language), or one or more video tracks, or caption tracks. The reception apparatus may process the dynamic event process by sending an Event Stream Event Web Socket message (see A/344 Standard Section 9.5.3) to the broadcaster application when the reception apparatus encounters an 'emsg' box in the stream corresponding to a type of event that has been registered for by the broadcaster application (see A/344 Standard Section 9.5). That message may contain the information the broadcaster application needs to know to display a certain dialog box. For example, when at a particular point in the playback of content, an 'emsg' may be encountered that causes the broadcaster application to display interactive information (e.g., a selectable icon) to the user.

For static events, in some embodiments, the broadcaster application needs to know where in the timeline of playback the user is currently viewing since trick play modes (e.g., pause, fast forward, rewind, etc.) may occur during playback. To announce a static event, for example, the MPD includes an EventStream element that identifies the timing within the context of an MPD Period where a given event is to occur. See ISO/IEC 23009-1 clause 5.10.2 "MPD Events."

Static events can be processed if the reception apparatus knows the time within the media that a given event is to occur so that the reception apparatus can synchronize itself to a media timeline in effect as the user plays back the content, and perform the interactivity when the appropriate point in the playback occurs. For example, an ATSC 3.0 runtime application environment may support application/content playback synchronization by means of WebSocket APIs known to one of ordinary skill in the art such as those defined in the A/344 Standard, Section 9.13 RMP, Content Synchronization APIs. When a broadcaster application needs to know the current presentation time of content being presented, the Content Synchronization API may be invoked to enable the broadcaster application to present supplemental content that is synchronized to the presented content (e.g., display of a graphical overlay at a predetermined time in a program).

In some embodiments, when a user performs any trick play operation on playback, the broadcaster application can be notified of this trick play operation by subscribing to the RMP Media Time Change event notification (see A/344 Standard, Section 9.6.12, Subscribe RMP Media Time Change Notification API). Accordingly, by keeping the broadcaster application informed of trick play operations, the broadcaster application can present content that is synchronized to the content that is being played back from the pause buffer.

Unlike broadcaster applications, for which WebSocket APIs are defined to establish time synchronization between the application and the playback of content, native broadcaster applications do not have standardized methods to allow these applications to communicate with the reception apparatus. The application titled "Broadcaster Application Remote Control Key Handling, U.S. patent application Ser. No. 16/199,089issued as U.S. Patent No. 10,743,057, filed on Nov. 23, 2018, the entire contents of which are incorporated herein by reference, discloses a proprietary API in which a manufacturer offers a general-purpose communication path between a broadcaster's native application and a broadcaster application. Since, according to some embodiments, the broadcaster application can be synchronized to content played back from the pause buffer as disclosed above, the broadcaster application could use this communication path to notify a native broadcaster application of a timeline of content played back from the pause buffer and any adjustments to the timeline that would be caused by the user interacting with the content (e.g., fast forward, rewind, pause).

According to some embodiments, a broadcaster service (e.g., ATSC 3.0 service) may be broadcast with multiple video tracks that allows the user to choose which point of view they would like to see a program. For example, a car race can offer views from within the cockpits of different cars. The choice of which video view a given viewer will see at a given time is expected to be made as that viewer interacts with broadcaster application. The broadcaster application can provide the user interface to allow the user to make the choice of view.

Figure 8:
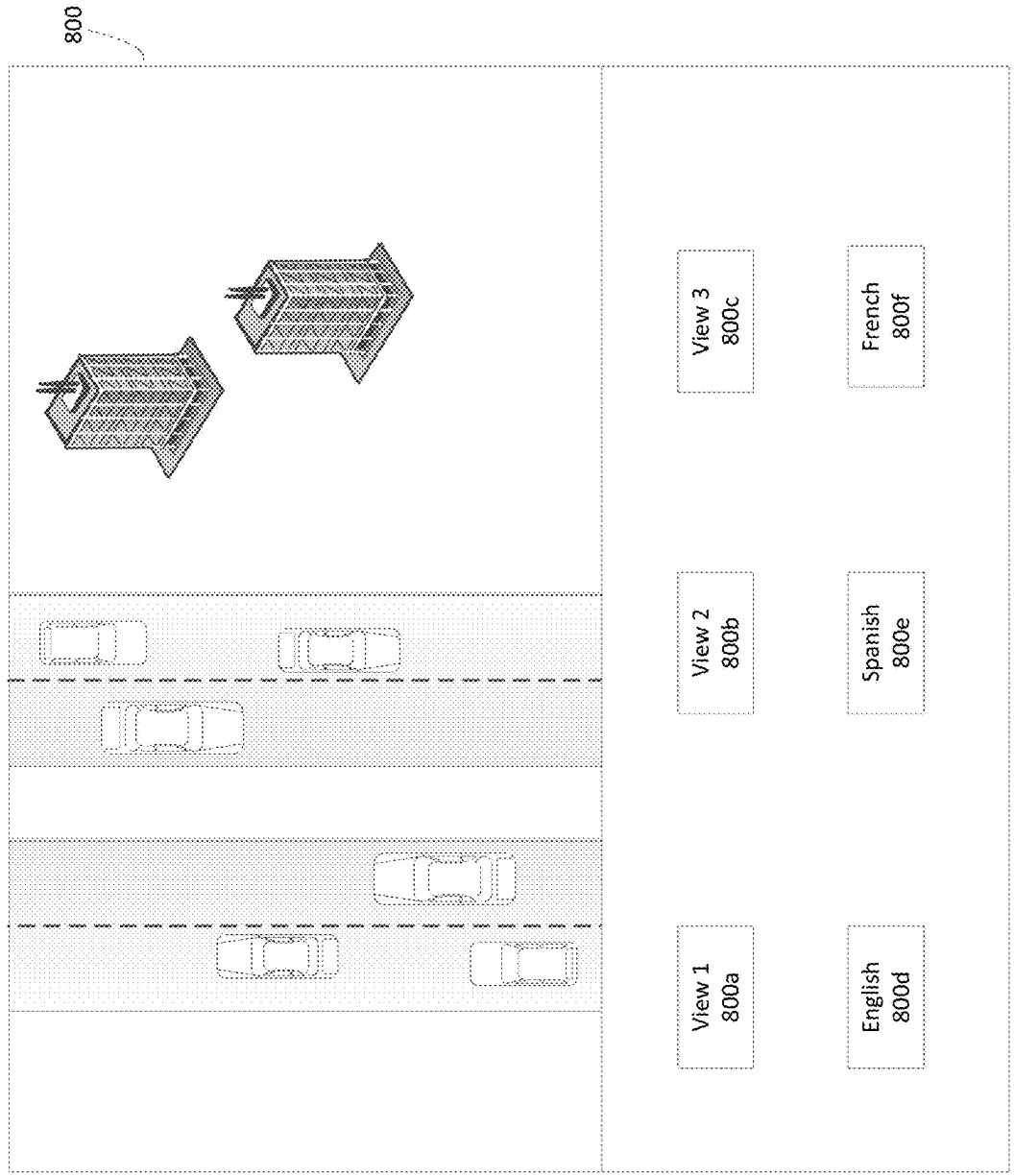
FIG. 8 illustrates an exemplary display with a plurality of content service features.

FIG. 8 illustrates an exemplary display of content 800 as well as available content service features. For example, the content service features 800a to 800c provide options of different viewing preferences of view 1 to view 3, respectively. Furthermore, the content service features 800d to 800f illustrate available language preferences such as English, Spanish, French, respectively. Accordingly, the content service features 800a to 800f may be available during a live broadcast of the content illustrated in the display 800. Additionally, these content service features may also be available during a time-shifted playback of content as if the user were viewing the content live. As understood by one of ordinary skill in the art, the present embodiments are not limited to the content service features illustrated in FIG. 8, and can include any content service feature known to one of ordinary skill in the art.

Thus, the presently disclosed embodiments, which include the feature of including all possible video tracks in time-shifted content, provides the user with the significantly advantageous features of choosing viewing features that would have been available during the live broadcast. Furthermore, the user can play the same program or portion of a program multiple times and choose different video views upon different viewings.

According to some embodiments, the reception apparatus can adjust an operating system clock based on a clock referenced or used by a broadcaster. In this regard, the reception apparatus can obtain a current time of day using a standard system call such as:
import java.util.Calendar
Calendar rightNow=Calendar.getInstance( ).

However, this standard system call may yield a value for a current time that is in error by either a small or large amount. Any disparity between the current time of day clock in the reception apparatus and a clock at the broadcaster can cause problems in acquisition of the service. Accordingly, improvements to obtaining an accurate clock within a reception apparatus are needed to mitigate and eliminate the significant disadvantages that result from having an inaccurate time of day clock at the reception apparatus.

In some embodiments, a television receiver application run by the reception apparatus derives the time of day clock, to be used for managing a service acquisition process, from the AST value and the timing of the received media segments themselves. The clock observed by the broadcaster is considered to be more accurate than the clock in the television reception apparatus because broadcasters are expected to synchronize the timing of programs via a GPS system. For example, if the AST indicates that a given media segment that has just been received will be available at time X based on the broadcaster's understanding of time of day, the corresponding system time is derived, in some embodiments, as follows:

> Wall Clock Time=OS_clock+(signaled_AST-observed_AST)

where
(a) Wall Clock Time is the time the television receiver application uses in computations involving time of day;
(b) OS_clock is the time of day reported by the operating system;
(c) signaled_AST is the availabilityStartTime signaled in the broadcast MPD; and
(d) observed_AST is the AST the receiver has calculated based on an observation of when a given Media Segment is received relative to when it was expected to have been received if the OS_clock was accurate (e.g., observed_AST=signaled_AST+(media arrival time−expected media arrival time).

According to the above example equation, if the observed AST is the same as what was signaled, then the OS_clock is accurate, and no adjustment needs to be made. However, if the observed AST indicates a time advanced from (i.e., in the future relative to) the signaled AST, the media segments are arriving sooner than would be expected if the OS_clock were correct. Accordingly, in this scenario, the Wall Clock Time is reduced by an amount corresponding to the discrepancy relative to the OS_clock.

If the observed AST indicates a time delayed from (i.e., in the past, relative to) the signaled AST, the media segments arrived later than would be expected if the OS_clock were correct. Accordingly, in this scenario, the Wall Clock Time is set to an amount corresponding to the discrepancy relative to the OS_clock. During an initial time (e.g., time=0, for example at power up of reception apparatus), the Wall Clock Time may be set to the OS_clock. While the Wall Clock Time is adjusted, the OS_clock is not adjusted.

Figure 9:
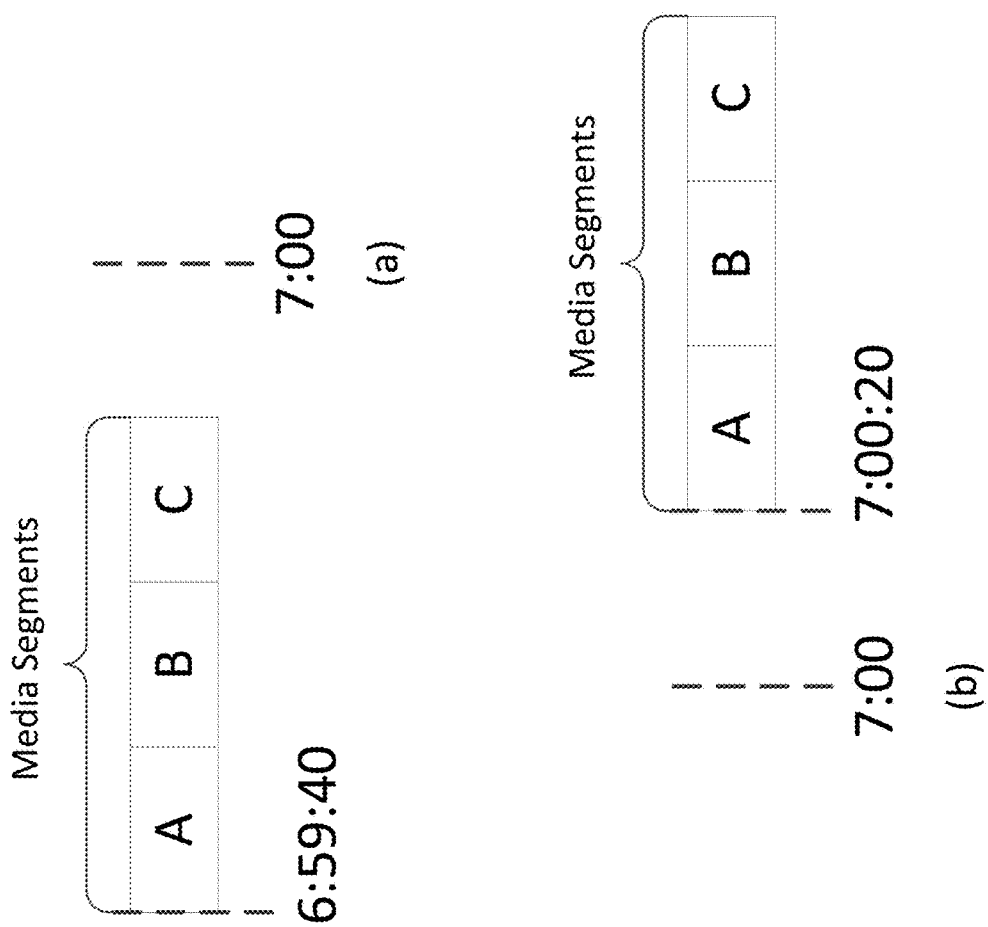
FIG. 9 illustrates an exemplary relationship between an operating system clock and an arrival time of media seconds.

Based on this method, even large errors of the OS_clock relative to the correct time of day used by the broadcaster are accommodated. FIG. 9 illustrates example scenarios with respect to an expected time that media segments are expected to arrive, and an actual arrival time of the media segments. For example, FIG. 9(a) illustrates a scenario where the OS_clock is 20 seconds slow. In this situation, media segments would be observed coming in and being "available" 20 seconds ahead of when they would have been expected. As illustrated in FIG. 9(a), the media segments are expected to arrive at 7:00, however, the media segments arrive 20 seconds earlier (e.g., 6:59:40) than when they are expected to arrive (e.g., 7:00:00). Accordingly, the observed AST would be 20 seconds smaller than the signaled AST (e.g., signaled_AST−observed_AST)=20 seconds). Thus, an adjustment of 20 seconds would be made by adding 20 seconds to the OS_clock to yield an accurate Wall Clock Time.

FIG. 9(b) illustrates an example where the OS_clock is 20 seconds too fast. As illustrated in FIG. 9(b), media segments are observed coming in and being "available" 20 seconds later (e.g., 7:00:20) compared to when the segments would have been expected to arrive (e.g., 7:00:00). Accordingly, the observed_AST would be 20 seconds larger than the signaled_AST (e.g., signaled_AST-observed_AST=−20 seconds). Thus, an adjustment of −20 seconds is made, thereby subtracting 20 seconds from the OS_clock to yield an accurate Wall Clock Time.

Figure 10:
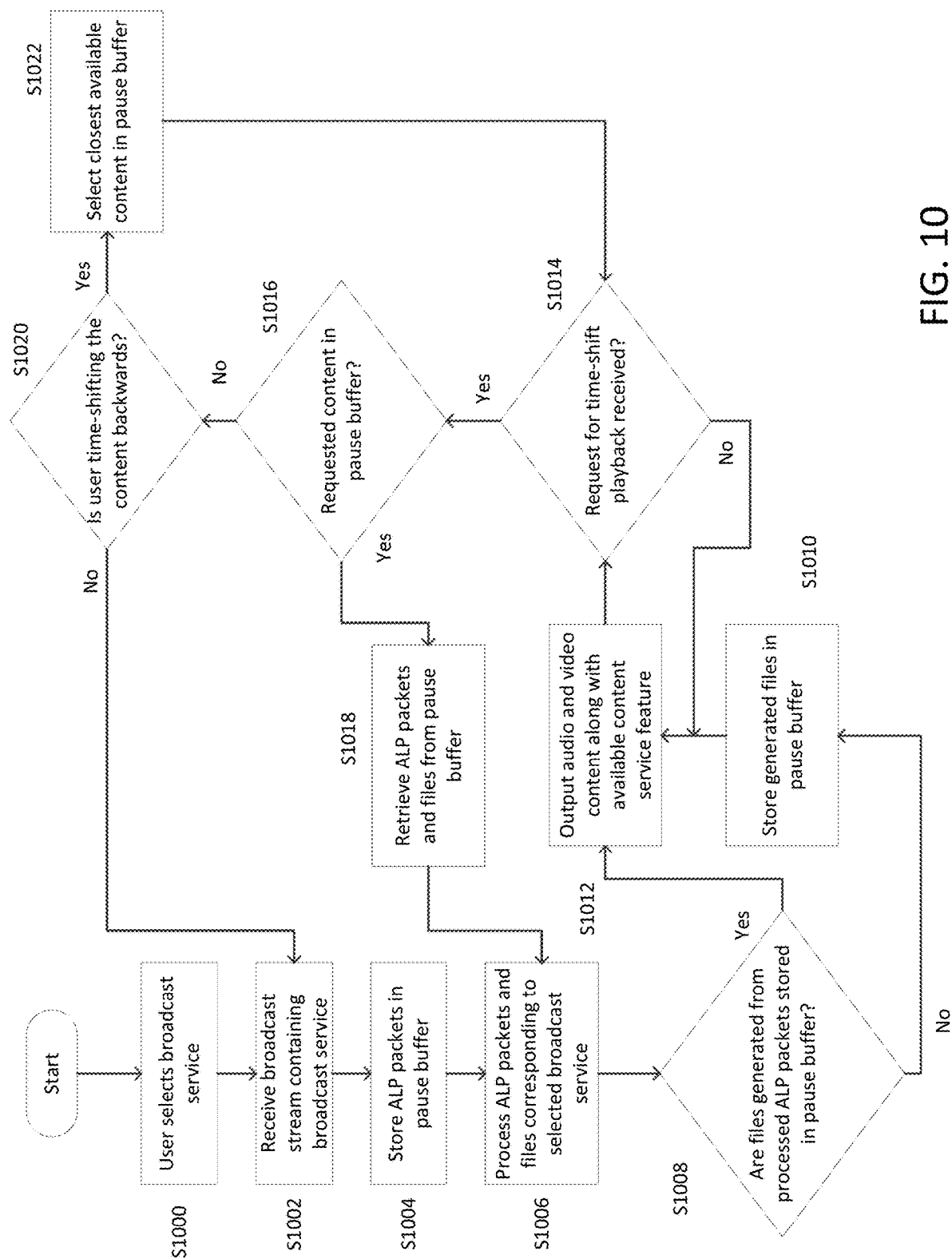
FIG. 10 illustrates an exemplary process performed by the reception apparatus.

FIG. 10 illustrates an embodiment of a process performed by the reception apparatus 120. The process generally starts at step S1000 where the user selects a broadcast service (e.g., selection of a program while viewing an EPG). The process flows to step S1002 where the reception apparatus receives a broadcast stream (e.g., broadcast stream illustrated in FIG. 4) containing the selected broadcast service. The process flows to step S1004 where the reception apparatus stores ALP packets in a pause buffer (e.g., storage 280).

The process flows to step S1006 where the ALP packets and files corresponding to the selected broadcast service are processed such as 1) converting ALP packets into IP packets; 2) processing the Lower Layer Signaling (LLS) and Service Level Signaling (SLS) files for each service multiplexed in the broadcast signal to discover information about each file object in the broadcast; and 3) retrieving each file object and saving it into a file system. The process flows to step S1008 where it is determined whether the files generated from the processed ALP packets are stored in the pause buffer. If the files generated from the processed ALP packets are not stored in the pause buffer, the process proceeds to step S1010 where the generated files are stored in the pause buffer. If the files generated from the processed ALP packets are stored in the pause buffer the process proceeds to step S1012 where audio and video content are outputted to a display, and content service features such as language preferences are made available, where the user may press a button to activate one of these content service features.

The process proceeds to step S1014 where it is determined whether a request for time-shift playback is received. For example, a request for time-shift playback may correspond to a request to rewind or fast forward content that a user is currently viewing, or a request to change from the selected broadcast service to another broadcast service, where the user may rewind or fast forward another broadcast service relative to the point in time the user is currently watching the selected broadcast service.

If the request for time-shift playback is not received, the process returns to step S1012, where the user may continue to view the playback of content. If the request for time shift playback is received, the process proceeds to step S1016, where it is determined whether the requested content is in the pause buffer. As content is written into the pause buffer, or files are deleted, the receiver can keep track of the duration of playback time available in the buffer, accounting for all elements of the program (e.g. video, audio, captions, and interactive content). This can then be used to determine whether the requested content is available in the pause buffer. If the requested content is in the pause buffer, the process proceeds to step S1018 where ALP packets and files associated with the requested content are retrieved from the pause buffer. The process proceeds to step S1018 to step 1006 to process the retrieved ALP packets and files corresponding to the requested content associated with the request for time-shift playback.

If the requested content is not in the pause buffer, the process proceeds from step S1016 to step S1020 to determine whether the user is time-shifting the content backwards (e.g., user presses reverse button). If the user is time-shifting the content backwards, the process proceeds to step S1022 where the closest available content in the pause buffer is selected. For example, this scenario may arise when the user desires to move the content backwards by 5 minutes, but only 3 minutes of recordings is available in the pause buffer. When this situation occurs, the closest available content to the desired time-shifted content is provided to the user. The process returns from step S1022 to step S1014.

Returning to step S1020, if the user is not time-shifting the content backwards, then the user is time-shifting the content forwards (e.g., user presses fast forward button). Accordingly, the process returns from step S1020 to step S1002 to obtain the newest available content. The process illustrated in FIG. 10 may end at any point that a user shuts off a television receiver application or a television receiver apparatus.

Figure 11:
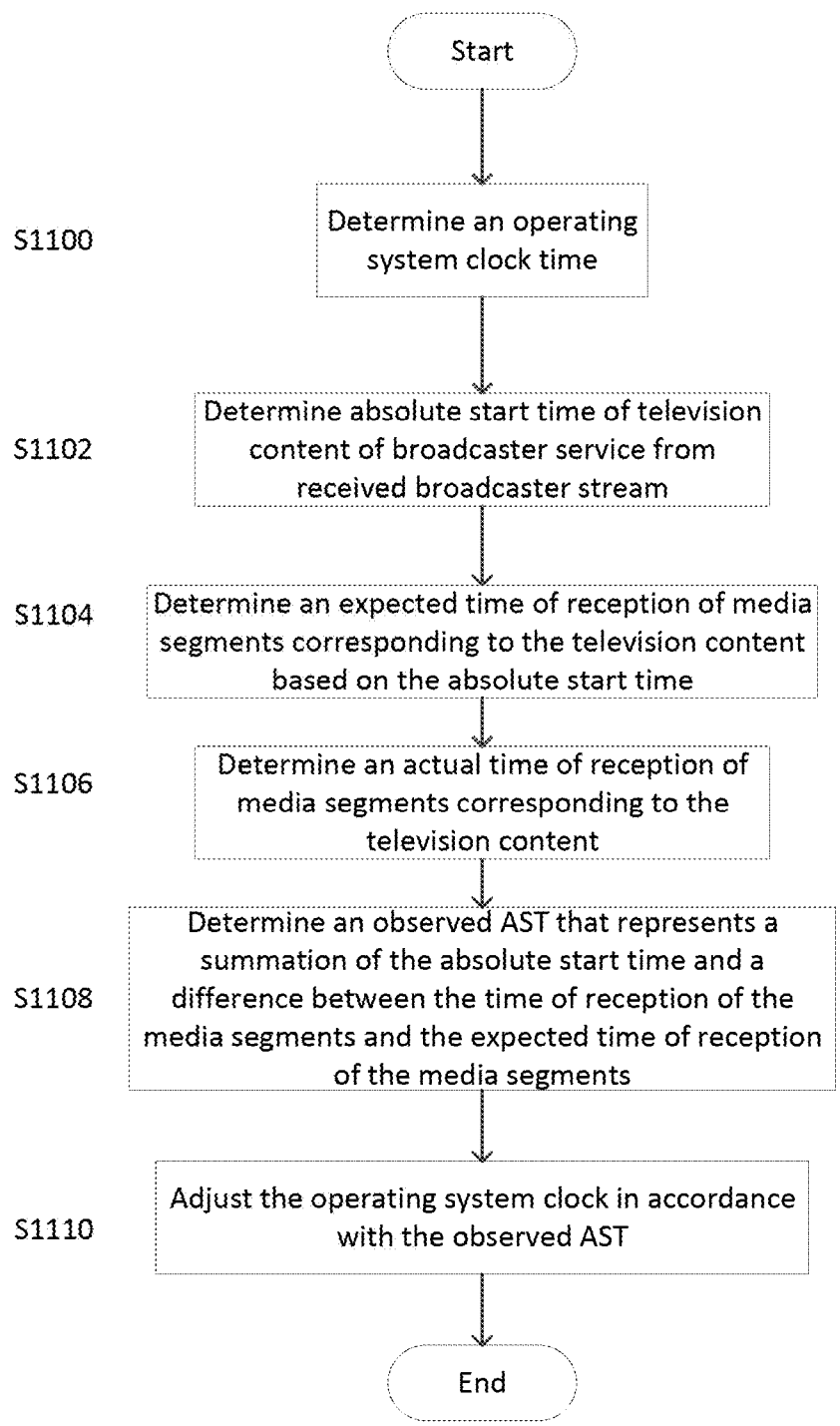
FIG. 11 illustrates an exemplary process performed by the reception apparatus.

FIG. 11 illustrates an embodiment of a process performed by the reception apparatus. The process generally starts at step S1100 where an operating system clock time is determined (e.g., OS_clock). The process proceeds to step S1102 to determine an Availability Start Time of television content of a broadcaster service from a received broadcast stream (e.g., signaled_AST). This Availability Start Time may be retrieved from an MPD file included in the broadcast stream. The process proceeds to step S1104 to determine an expected time of reception of media segments corresponding to the television content based on the Availability Start Time. The expected time of reception of the media segments may be determined based on the Availability Start Time included in the MPD file.

The process proceeds to step S1106 to determine an actual time of reception of media segments corresponding to the television content. The process proceeds to step S1108 to determine an observed_AST that represents a summation between the Availability Start Time (e.g., signaled_AST) and a difference between the time of reception of the media segments and the expected time of reception of the media segments (e.g., observed_AST=signaled_AST+(media arrival time-expected media arrival time). The process proceeds to step S1110 to adjust the operating system clock in accordance with the observed_AST (e.g., Wall Clock Time=OS_clock+(signaled_AST−observed_AST)).

Figure 12:
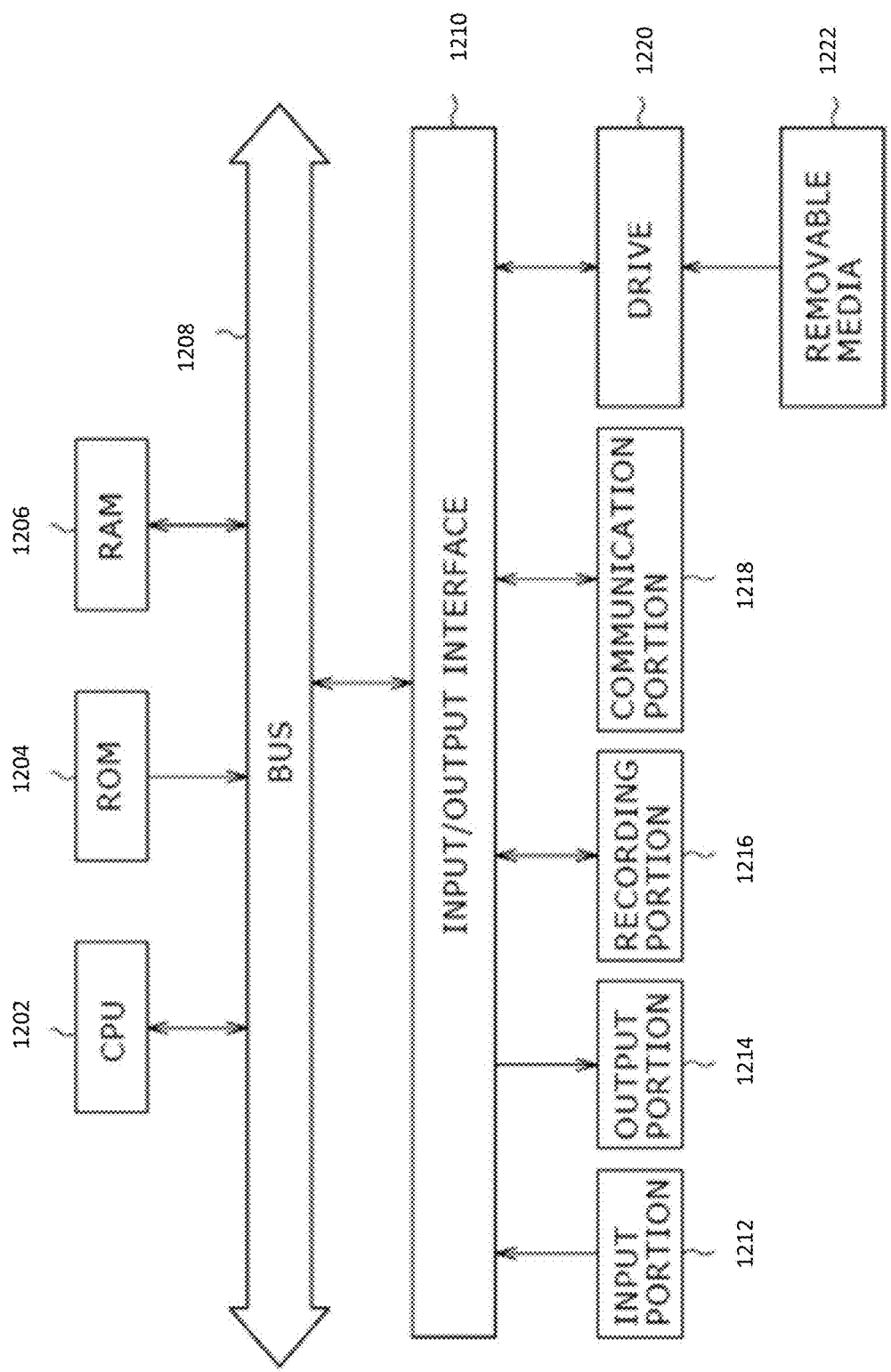
FIG. 12 illustrates an example hardware configuration of a computer.

FIG. 12 is a block diagram showing an example of a hardware configuration of a computer that can be configured to perform functions of any one or a combination of reception apparatus and service distribution system. For example, in one embodiment, the computer is configured to perform one or a combination of the functions described herein with respect to the reception apparatus 20 and/or the service provider 102.

As illustrated in FIG. 12 the computer includes a CPU 1202, ROM (read only memory) 1204, and a RAM (random access memory) 1206 interconnected to each other via one or more buses 1208. The one or more buses 1208 are further connected with an input-output interface 1210. The input-output interface 1210 is connected with an input portion 1212 formed by a keyboard, a mouse, a microphone, remote controller, etc. The input-output interface 1210 is also connected to an output portion 1214 formed by an audio interface, video interface, display, speaker and the like; a recording portion 1216 formed by a hard disk, a non-volatile memory or other non-transitory computer readable storage medium; a communication portion 1218 formed by a network interface, modem, USB interface, fire wire interface, etc.; and a drive 1220 for driving removable media 1222 such as a magnetic disk, an optical disk, a magneto-optical disk, a semiconductor memory, etc.

According to one embodiment, the CPU 1202 loads a program stored in the recording portion 1216 into the RAM 1206 via the input-output interface 1210 and the bus 1208, and then executes a program configured to provide the functionality of the one or a combination of the functions described herein with respect to the reception apparatus 120 and/or the service provider 102.

The hardware description above, exemplified by any one of the structure examples shown in FIGS. 2 and 12, constitutes or includes specialized corresponding structure that is programmed or configured to perform the algorithm describe above, for example with reference to FIGS. 10 and 11. For example, any one or a combination of the algorithms shown in FIGS. 10 and 11 may be completely performed by the circuitry included in the single device shown in FIG. 2.

Obviously, numerous modifications and variations are possible in light of the above teachings. It is therefore to be understood that within the scope of the appended claims, the present disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the present disclosure, as well as other claims. The disclosure, including any readily discernible variants of the teachings herein, defines, in part, the scope of the foregoing claim terminology such that no inventive subject matter is dedicated to the public.

Embodiments of the present disclosure include significantly advantageous features such as:
(1) Available storage with enough capacity to buffer a significant amount of content.
(2) Directly buffering received ALP packets from the tuner/demod for playback from the pause buffer.

(3) The amount of time shift to be imposed is adjustable, from zero (e.g., viewing live TV) to any desired amount in accordance with available memory in the pause buffer.

(4) Ability to record multiple TV services in a pause buffer to offer instant channel change to a service carried in the same broadcast stream along with the ability to rewind to see previously-broadcast content on such a service after making the switch to the service.

(5) Availability of trick-play playback (e.g., fast-forward, fast-rewind, pause, etc.) when playing content from the pause buffer.

(6) Ability to choose playback options (e.g., content service features) such as choice of language for audio or captions or a different video track on time-shifted playback, the same as if the content were played live.

(7) Ability to interact with time-shifted content.

(8) Ability to deal with errors in the accuracy of operating system time relative to the GPS-accurate time used by the broadcasters.

The above disclosure also encompasses the embodiments listed below.

(1) A reception apparatus including receiver circuitry configured to receive a broadcast stream that includes (i) a first broadcaster service selected by a user and (ii) a second broadcaster service; a demodulator configured to demodulate the broadcast stream into a plurality of data packets; and processing circuitry configured to store the plurality of data packets corresponding to the first and second broadcaster services in a pause buffer, process each data packet associated with the selected first broadcaster service to extract audio and video content, and output, as part of a live TV broadcast, the extracted audio and video content associated with the first broadcaster service to the user during a first time period.

(2) The reception apparatus according to feature (1), in which the processing circuitry is further configured to receive, during a second time period later than the first time period, user input indicating a request to produce audio and video content associated with the second broadcaster service available during an intermediate time period that is between the first time period and the second time period, retrieve, from the pause buffer, data packets associated with the audio and video content available during the intermediate time period, process each data packet retrieved from the pause buffer to extract the audio and video content available during the intermediate time period, and output, as part of a time-shift playback, the audio and video content available during the intermediate time period for the second broadcaster service.

(3) The reception apparatus according to feature (2), in which the processing circuitry is further configured to provide at least one content service feature during the time-shift playback of the audio and video content available during the intermediate time period for the second broadcaster service, wherein the at least one content service feature is included in the broadcast stream.

(4) The reception apparatus according to any one of features (1)-(3), in which the processing circuitry is further configured to receive, during a second time period later than the first time period, user input indicating a request to produce audio and video content associated with the first broadcaster service available during an intermediate time period that is between the first time period and the second time period, retrieve, from the pause buffer, data packets associated with the audio and video content available during the intermediate time period, process each data packet retrieved from the pause buffer to extract the audio and video content available during the intermediate time period, output, as part of a time-shift playback, the audio and video content available during the intermediate time period for the second broadcaster service, and provide at least one content service feature during the time-shift playback of the audio and video content available during the intermediate time period for the first broadcaster service, wherein the at least one content service features is included in the received broadcast stream.

(5) The reception apparatus according to feature (3) or (4), in which the at least one content service associated with the first broadcaster service is selected from a group consisting of closed captioning, a non-primary language audio, non-primary language subtitles, and an alternate viewing angle.

(6) The reception apparatus according to any one of features (3)-(5), in which the processing circuitry is configured to execute a broadcaster application that is provided with the received broadcast stream, wherein the broadcaster application displays a plurality of user selectable options that include the at least one content service feature.

(7) The reception apparatus according to feature (6), in which the broadcaster application is configured to synchronize the at least one content service feature with the time-shift playback of the audio and video content available during the intermediate time period.

(8) The reception apparatus according to any one of features (1)-(7), in which the processing circuitry is further configured to determine whether each file generated from the processing of each data packet is stored in the pause buffer, in response to the determination that a file from the generated files is not stored in the pause buffer, store the file in the pause buffer, and in response to the determination that a file from the generated files is stored in the pause buffer, discard the file.

(9) The reception apparatus according to any one of features (1)-(7), in which each broadcaster service included in the received broadcast stream is an Advanced Television Systems Committee (ATSC) service, and the plurality of data packets are ATSC Link-layer Protocol (ALP) packets.

(10) A reception apparatus including receiver circuitry configured to receive a broadcast stream that includes a broadcaster service selected by a user; a demodulator configured to demodulate the broadcast stream into a plurality of data packets; and processing circuitry configured to store the plurality of data packets in a pause buffer, process each data packet associated with the selected broadcaster service to extract audio and video content, output, as part of a live TV broadcast, the extracted audio and video content to the user during a first time period, receive, during a second time period later than the first time period, user input indicating a request to produce audio and video content available during an intermediate time period that is between the first time period and the second time period, retrieve, from the pause buffer, data packets associated with the audio and video content available during the intermediate time period, process each data packet retrieved from the pause buffer to extract the audio and video content available during the intermediate time period, output, as part of a time-shift playback, the audio and video content available during the intermediate time period, and provide at least one content service feature during the time-shift playback of the audio and video content available during the intermediate time period, in which the at least one content service feature is included in the plurality of data packets that are stored and retrieved from the pause buffer.

(11) The reception apparatus according to feature (10), in which the plurality of data packets that stored and retrieved from the pause buffer are IP packets or Advanced Television Systems Committee (ATSC) Link-layer Protocol (ALP) packets.

(12) The reception apparatus according to feature (10) or (11), in which the plurality of data packets stored and retrieved from the pause buffer includes Dynamic Adaptive Streaming over HTTP (DASH) content or MPEG Media Transport (MMT) content.

(13) The reception apparatus according to any one of features (10)-(12), in which the at least one content service associated with the broadcaster service is selected from a group consisting of closed captioning, a non-primary language audio, non-primary language subtitles, and an alternate viewing angle.

(14) A reception apparatus including receiver circuitry configured to receive a broadcast stream that includes a broadcaster service selected by a user; a demodulator configured to demodulate the broadcast stream into a plurality of data packets; and processing circuitry configured to determine an operating system clock time, process the data packets to determine a signaled availability starting time (AST) of television content associated with the broadcaster service, determine an expected time of reception of media segments corresponding to the television content based on the signaled AST, determine an actual time of reception of media segments corresponding to the television content, determine an observed AST that represents a summation of the signaled AST with a difference between the time of reception of the media segments and the expected time of reception of the media segments, determine a playback clock time that is offset from the operating system clock time in accordance with the observed AST, and output audio and video content associated with the received broadcaster service in accordance with the determined playback clock time.

(15) The reception apparatus according to feature (14), in which the playback clock time is offset from the operating system clock by adding a difference between the signaled AST and the observed AST to the operating system clock.

(16) The reception apparatus according to feature (14) or (15), in which the signaled AST is included in a media presentation description file.

(17) The reception apparatus according to feature (14), in which the broadcaster service included in the broadcast stream is an Advanced Television Systems Committee (ATSC) service, and the plurality of data packets are ATSC Link-layer Protocol (ALP) packets.

(18) A non-transitory computer readable medium including instructions stored therein, which when executed by a processor in a reception apparatus causes the processor to execute a method including storing, in a pause buffer, a plurality of data packets corresponding to a first broadcaster service selected by a user and a second broadcaster service, the first and second broadcaster services received in a broadcast stream that is demodulated into the plurality of data packets; processing each data packet associated with the selected first broadcaster service to extract audio and video content; and outputting, as part of a live TV broadcast, the extracted audio and video content associated with the first broadcaster service to the user during a first time period.

(19) A non-transitory computer readable medium including instructions stored therein, which when executed by a processor in a reception apparatus causes the processor to execute a method including storing, in a pause buffer, a plurality of data packets corresponding to a broadcaster service received in a broadcast stream that is demodulated into the plurality of data packets; processing each data packet associated with the selected broadcaster service to extract audio and video content; outputting, as part of a live TV broadcast, the extracted audio and video content to the user during a first time period; receiving, during a second time period later than the first time period, user input indicating a request to produce audio and video content available during an intermediate time period that is between the first time period and the second time period; retrieving, from the pause buffer, data packets associated with the audio and video content available during the intermediate time period; processing each data packet retrieved from the pause buffer to extract the audio and video content available during the intermediate time period; outputting, as part of a time-shift playback, the audio and video content available during the intermediate time period; and providing at least one content service feature during the time-shift playback of the audio and video content available during the intermediate time period, in which the at least one content service feature is included in the plurality of data packets that are stored and retrieved from the pause buffer.

(20) A non-transitory computer readable medium including instructions stored therein, which when executed by a processor in a reception apparatus causes the processor to execute a method including processing data packets demodulated from a received broadcast stream to determine a signaled availability starting time (AST) of television content associated with a broadcaster service included in the received broadcast stream; determining an expected time of reception of media segments corresponding to the television content based on the signaled AST; determining an actual time of reception of media segments corresponding to the television content; determining an observed AST that represents a summation of the signaled AST with a difference between the time of reception of the media segments and the expected time of reception of the media segments; determining a playback clock time that is offset from the operating system clock time in accordance with the observed AST; and outputting audio and video content associated with the received broadcaster service in accordance with the determined playback clock time.

The invention claimed is:

1. A reception apparatus comprising:
receiver circuitry configured to receive a single Advanced Television Systems Committee (ATSC) 3.0 broadcast stream that includes (i) a first broadcaster service selected by a user and (ii) a second broadcaster service;
a demodulator configured to demodulate the single ATSC 3.0 broadcast stream into a plurality of data packets; and
processing circuitry configured to:
store the plurality of data packets corresponding to the first and second broadcaster services of the single ATSC 3.0 broadcast stream in a pause buffer, the stored plurality of data packets including low level signaling and service layer signaling of the first and second broadcaster services,
process each data packet associated with the selected first broadcaster service to extract audio and video content, and
output, as part of a live TV broadcast, the extracted audio and video content associated with the first broadcaster service to the user during a first time period.

2. The reception apparatus according to claim 1, wherein the processing circuitry is further configured to:

receive, during a second time period later than the first time period, user input indicating a request to produce audio and video content associated with the second broadcaster service available during an intermediate time period that is between the first time period and the second time period, retrieve, from the pause buffer, data packets associated with the audio and video content available during the intermediate time period, process each data packet retrieved from the pause buffer to extract the audio and video content available during the intermediate time period, and output, as part of a time-shift playback, the audio and video content available during the intermediate time period for the second broadcaster service.

3. The reception apparatus according to claim 2, wherein the processing circuitry is further configured to provide at least one content service feature during the time-shift playback of the audio and video content available during the intermediate time period for the second broadcaster service, wherein the at least one content service feature is included in the single ATSC 3.0 broadcast stream.

4. The reception apparatus according to claim 3, wherein the at least one content service feature associated with the first broadcaster service is selected from a group consisting of closed captioning, a non-primary language audio, non-primary language subtitles, and an alternate viewing angle.

5. The reception apparatus according to claim 3, wherein the processing circuitry is configured to execute a broadcaster application that is provided with the received single ATSC 3.0 broadcast stream, wherein the broadcaster application displays a plurality of user selectable options that include the at least one content service feature.

6. The reception apparatus according to claim 5, wherein the broadcaster application is configured to synchronize the at least one content service feature with the time-shift playback of the audio and video content available during the intermediate time period.

7. The reception apparatus according to claim 1, wherein the processing circuitry is further configured to:

receive, during a second time period later than the first time period, user input indicating a request to produce audio and video content associated with the first broadcaster service available during an intermediate time period that is between the first time period and the second time period, retrieve, from the pause buffer, data packets associated with the audio and video content available during the intermediate time period, process each data packet retrieved from the pause buffer to extract the audio and video content available during the intermediate time period, output, as part of a time-shift playback, the audio and video content available during the intermediate time period for the second broadcaster service, and provide at least one content service feature during the time-shift playback of the audio and video content available during the intermediate time period for the first broadcaster service, wherein the at least one content service features is included in the received single ATSC 3.0 broadcast stream.

8. The reception apparatus according to claim 1, wherein the processing circuitry is further configured to determine whether each file generated from the processing of each data packet is stored in the pause buffer, in response to the determination that a file from the generated files is not stored in the pause buffer, store the file in the pause buffer, and in response to the determination that a file from the generated files is previously stored in the pause buffer, discard the file.

9. The reception apparatus according to claim 1, wherein each broadcaster service included in the received single ATSC 3.0 broadcast stream is a different ATSC 3.0 service, the plurality of data packets are ATSC Link-layer Protocol (ALP) packets, and each broadcaster service is associated with different data packets of the plurality of data packets.

10. The reception apparatus according to claim 1, wherein the processing circuitry is configured to store the plurality of data packets corresponding to both the first and second broadcaster services of the single ATSC 3.0 broadcast stream in the pause buffer in response to the selection of the first broadcaster service by the user.

11. The reception apparatus according to claim 1, wherein the processing circuitry is configured to store the plurality of data packets corresponding to both the first and second broadcaster services of the single ATSC 3.0 broadcast stream in the pause buffer irrespective of whether the second broadcast service was previously selected by the user.

12. A non-transitory computer readable medium including instructions stored therein, which when executed by a processor in a reception apparatus cause the processor to execute a method comprising:

storing, in a pause buffer, a plurality of data packets corresponding to a first broadcaster service selected by a user and a second broadcaster service, the first and second broadcaster services received in a single Advanced Television Systems Committee (ATSC) 3.0 broadcast stream that is demodulated into the plurality of data packets, the stored plurality of data packets including low level signaling and service layer signaling of the first and second broadcaster services;

processing each data packet associated with the selected first broadcaster service to extract audio and video content; and outputting, as part of a live TV broadcast, the extracted audio and video content associated with the first broadcaster service to the user during a first time period.

13. A reception method comprising:

receiving a single Advanced Television Systems Committee (ATSC) 3.0 broadcast stream that includes (i) a first broadcaster service selected by a user and (ii) a second broadcaster service;

demodulating the single ATSC 3.0 broadcast stream into a plurality of data packets;

storing, by processing circuitry, the plurality of data packets corresponding to the first and second broadcaster services of the single ATSC 3.0 broadcast stream in a pause buffer, the stored plurality of data packets including low level signaling and service layer signaling of the first and second broadcaster services, processing each data packet associated with the selected first broadcaster service to extract audio and video content, and outputting, as part of a live TV broadcast, the extracted audio and video content associated with the first broadcaster service to the user during a first time period.

* * * * *